United States Patent
Wang et al.

(10) Patent No.: US 9,870,516 B2
(45) Date of Patent: *Jan. 16, 2018

(54) HAND-DRAWN SKETCH RECOGNITION

(71) Applicant: Microsoft Technology Licensing, LLC, Redmond, WA (US)

(72) Inventors: Changhu Wang, Beijing (CN); Lei Zhang, Beijing (CN); Zhenbang Sun, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/847,834

(22) Filed: Sep. 8, 2015

(65) Prior Publication Data
US 2015/0379375 A1   Dec. 31, 2015

Related U.S. Application Data

(63) Continuation of application No. 13/886,904, filed on May 3, 2013, now Pat. No. 9,147,125.

(51) Int. Cl.
*G06K 9/00* (2006.01)
*G06K 9/62* (2006.01)
*G06F 17/30* (2006.01)

(52) U.S. Cl.
CPC ..... *G06K 9/6202* (2013.01); *G06F 17/30259* (2013.01)

(58) Field of Classification Search
CPC ......... G06F 17/30277; G06F 17/30259; G06F 17/30247; G06F 17/30256; G06F 17/30805; G06F 17/30023; G06F 17/30424; G06K 9/48; G06K 9/6204; G06K 9/00624; G06K 9/46; G06K 9/4604; G06K 9/6202

See application file for complete search history.

(56) References Cited

U.S. PATENT DOCUMENTS

| | | |
|---|---|---|
| 5,734,893 A | 3/1998 | Li et al. |
| 5,761,655 A | 6/1998 | Hoffman |
| 6,044,365 A | 3/2000 | Cannon et al. |
| 6,182,069 B1 | 1/2001 | Niblack et al. |
| 6,243,713 B1 | 6/2001 | Nelson et al. |

(Continued)

FOREIGN PATENT DOCUMENTS

| | | |
|---|---|---|
| EP | 1630723 | 3/2006 |
| KR | 20080046490 | 5/2008 |
| WO | WO9945483 A1 | 9/1999 |

OTHER PUBLICATIONS

Alter, et al., "Extracting Salient Curves from Images: An Analysis of the Saliency Network", International Journal of Computer Vision at SpringerLink, Kluwer Academic Publishers, vol. 27, Issue 1, 1998, pp. 51-69.

(Continued)

*Primary Examiner* — Li Liu

(57) ABSTRACT

Some examples of a sketch-based image recognition system may generate a model for identifying a subject of a sketch. The model is formed from a plurality of images having visual features similar to the visual features of the sketch. The model may include object topics representative of categories which may correspond to the subject of the sketch and shape topics representative of the visual features of the sketch.

20 Claims, 8 Drawing Sheets

(56) References Cited

U.S. PATENT DOCUMENTS

| | | |
|---|---|---|
| 6,269,358 B1 | 7/2001 | Hirata |
| 6,463,432 B1 | 10/2002 | Murakawa |
| 6,564,263 B1 | 5/2003 | Bergman et al. |
| 6,574,366 B1 | 6/2003 | Fan |
| 6,606,623 B1 | 8/2003 | Hsieh et al. |
| 6,728,752 B1 | 4/2004 | Chen et al. |
| 6,975,755 B1 | 12/2005 | Baumberg |
| 7,133,572 B2 | 11/2006 | Neubauer et al. |
| 7,515,752 B2 | 4/2009 | Tremblay et al. |
| 7,574,048 B2 | 8/2009 | Shilman et al. |
| 7,583,272 B2 | 9/2009 | Ramani et al. |
| 7,639,250 B2 | 12/2009 | Xu et al. |
| 7,646,940 B2 | 1/2010 | Chellapilla et al. |
| 7,761,466 B1 | 7/2010 | Eshghi |
| 8,341,112 B2 | 12/2012 | Zhang et al. |
| 8,406,532 B2 | 3/2013 | Wang et al. |
| 8,494,286 B2 | 7/2013 | Capata et al. |
| 8,625,907 B2 | 1/2014 | Zitnick et al. |
| 8,873,812 B2 | 10/2014 | Larlus-Larrondo et al. |
| 2001/0032084 A1 | 10/2001 | Day |
| 2003/0194135 A1 | 10/2003 | Wenzel |
| 2003/0200236 A1 | 10/2003 | Hong |
| 2004/0165774 A1 | 8/2004 | Koubaroulis et al. |
| 2004/0249809 A1 | 12/2004 | Ramani et al. |
| 2005/0062740 A1 | 3/2005 | Tobita et al. |
| 2006/0114252 A1 | 6/2006 | Ramani et al. |
| 2007/0022329 A1 | 1/2007 | Adamek et al. |
| 2008/0187227 A1 | 8/2008 | Bober et al. |
| 2008/0193020 A1 | 8/2008 | Sibiryakov et al. |
| 2008/0243774 A1 | 10/2008 | Jaspers et al. |
| 2009/0074302 A1 | 3/2009 | Kishi |
| 2009/0254539 A1 | 10/2009 | Wen et al. |
| 2009/0287680 A1 | 11/2009 | Paek et al. |
| 2010/0076959 A1 | 3/2010 | Ramani et al. |
| 2010/0080469 A1 | 4/2010 | Liu et al. |
| 2010/0322522 A1 | 12/2010 | Wang et al. |
| 2011/0302522 A1 | 12/2011 | Cao et al. |
| 2012/0054177 A1 | 3/2012 | Wang et al. |
| 2012/0072410 A1 | 3/2012 | Wang et al. |
| 2012/0162244 A1* | 6/2012 | Ma ............... G06F 17/30277 345/594 |
| 2013/0127869 A1 | 5/2013 | Winnemoeller et al. |
| 2014/0279265 A1* | 9/2014 | Bhardwaj ......... G06Q 30/0627 705/26.63 |
| 2014/0328540 A1 | 11/2014 | Wang et al. |
| 2014/0328544 A1 | 11/2014 | Wang et al. |

OTHER PUBLICATIONS

Alvarado, et al., "SketchREAD: A Multi-Domain Sketch Recognition Engine", retrieved on Feb. 9, 2013 at <<http://rationale.csail.mit.edu/publications/Alvarado2004SketchREAD.pdf>>, Proceedings of ACM Symposium on User Interface Software and Technology (UIST), Oct. 24, 2004, pp. 23-32.

Barrow, et al., "Parametric correspondence and chamfer matching: two new techniques for image matching", retrieved on Jun. 7, 2010 at <<http://dli.iiit.ac.in/ijcai/IJCAI-77-VOL2/PDF/024.pdf>>, Morgan Kaufmann Publishers Inc., Proceedings of International Joint Conference on Artificial Intelligence (Vision-7), Cambridge, MA, 1977, pp. 659-663.

Belongie et al., "Shape Matching and Object Recognition Using Shape Contexts", IEEE Transactions on Pattern Analysis and Machine Intelligence, vol. 24, No. 24, Apr. 2002, pp. 509-522.

Berretti et al., "Indexed retrieval by shape appearance", Image and Signal Processing, vol. 147, No. 4, 2000, 7 pages.

Blei et al., "Latent Dirichlet Allocation", Journal of Machine Learning Research 3, 2003, pp. 993-1022.

Blei et al., "Modeling Annotated Data", SIGIR'03, Jul. 28-Aug. 1, 2003, Toronto, Canada, 8 pages.

Blei et al., "Supervised Topic Models", Statistical Science, Mar. 3, 2010, 22 pages.

Bober, "MPEG-7 Visual Shape Descriptors", IEEE Transactions on Circuits and Systems for Video Technology, vol. 11, No. 6, Jun. 2001, pp. 716-719.

Borgefors, "Hierarchical Chamfer Matching: A Parametric Edge Matching Algorithm", retrieved on Feb. 9, 2013 at <<http://ieeexplore.ieee.org/stamp/stamp.jsp?tp=&arnumber=9107>>, IEEE Transactions on Pattern Analysis and Machine Intelligence, vol. 10, No. 6, Nov. 1988, pp. 849-865.

Boykov, et al., "Graph Cuts and Efficient N-D Image Segmentation", retrieved on Feb. 9, 2013 at <<http://Ivelho.impa.br/ip12/reading/ijcv06.pdf>>, International Journal of Computer Vision, vol. 70, No. 2, Nov. 2006, pp. 109-131.

Bronstein, et al., "Shape Google: geometric words and expressions for invariant shape retrieval", retrieved on Feb. 9, 2013 at <<http://visl.technion.ac.il/bron/publications/BroBroOvsGuiTOG10.pdf>>, ACM Transactions on Graphics, vol. 30, No. 1, Jan. 2011, 22 pages.

Canny, "A Computational Approach to Edge Detection", retrieved on Jun. 8, 2010 at <<http://www.limsi.fr/Individu/vezien/PAPIERS_ACS/canny1986.pdf>>, IEEE Transactions on Pattern Analysis and Machine Intelligence, vol. PAMI-8, No. 6, Nov. 1986, pp. 679-698.

Cao, et al., "Edgel Index for Large-Scale Sketch-based Image Search", retrieved on Feb. 9, 2013 at <<http://research.microsoft.com/pubs/149199/0630.pdf>>, Proceedings of IEEE Conference on Computer Vision and Pattern Recognition (CVPR), Jun. 20, 2011, pp. 761-768.

Cao, et al., "MindFinder: Interactive Sketch-based Image Search on Millions of Images", retrieved on Feb. 9, 2013 at <<http://bcmi.sjtu.edu.cn/~zhangliqing/Papers/2010ACMMM-SketchSearch-Cao.pdf>>, Proceedings of ACM Intl Conference on Multimedia (MM), Oct. 25, 2010, pp. 1605-1608.

Carreira, et al., "Constrained Parametric Min-Cuts for Automatic Object Segmentation", retrieved on Feb. 9, 2013 at <<http://ieeexplore.ieee.org/stamp/stamp.jsp?tp=&arnumber=5540063>>, IEEE Conference on Computer Vision and Pattern Recognition (CVPR), Jun. 13, 2010, pp. 3241-3248.

Chalechale, et al., "Sketch-based image matching Using Angular partitioning", retrieved on Jun. 7, 2010 at <<http://ro.uow.edu.au/cgi/viewcontent.cgi?article=1048&context=infopapers>>, IEEE Transactions on Systems, Man and Cybernetics—Part A: Systems and Humans, vol. 35, No. 1, Jan. 2005, pp. 28-41.

Chinese Office Action dated Nov. 5, 2012 for Chinese patent application No. 201110266398.X, a counterpart foreign application of U.S. Appl. No. 12/873,007, 12 pages.

Chinese Office Action dated Jun. 21, 2013 for Chinese patent application No. 201110266398.X, a counterpart foreign application of U.S. Appl. No. 12/873,007, 6 pages.

Cole, et al., "Where Do People Draw Lines?", retrieved on Jun. 7, 2010 at <<http://portal.acm.org/ft_gateway.cfm?id=1360687&type=pdf&coll=GUIDE&dl=GUIDE&CFID=92349865&CFTOKEN=16151715>>, ACM Transactions on Graphics, vol. 27, No. 3, Article 88, Aug. 2008, pp. 1-12.

Danielsson et al., "Generic Object Class Detection using Boosted Configurations of Oriented Edges", School of Computer Science and Communications, Royal Inst. of Technology, Stockholm, Sweden, no publication date, 14 pages.

Datta, et al., "Image Retrieval: Ideas, Influences, and Trends of the New Age", retrieved on Jun. 7, 2010 at <<http://infolab.stanford.edu/~wangz/project/imsearch/review/JOUR/datta.pdf>>, ACM Computing Surveys, vol. 40, No. 2, Article 5, Apr. 2008, pp. 1-60.

Dinakaran et al., "Interactive Image Retrieval Using Text and Image Content", Cybernetics and Information Technologies vol. 10, No. 3, 2010, pp. 20-30.

Dubuc, et al., "Indexing visual representations through the complexity map", Proc. 5th Int'l Conf. Computer Vision, IEEE 1995, pp. 142-149.

Eitz, et al., "A descriptor for large scale image retrieval based on sketched feature lines", retrieved on Jun. 7, 2010 at <<http://perso.telecom-aristech.fr/~boubek/papers/SBIR/sbir.pdf>>, ACM, Proceedings of Eurographics Symposium on Sketch-Based Interfaces and Modeling, New Orleans, LA, 2009, pp. 29-36.

(56) References Cited

OTHER PUBLICATIONS

Eitz et al., "An evaluation of descriptors for large-scale image retrieval from sketched feature lines", Computers & Graphics, TU Berlin, Telecom ParisTech—CNRS LTCI, Jul. 19, 2010, 38 pages.
Faloutsos et al., "Efficient and Effective Querying by Image Content", Journal of Intelligent Information Systems, vol. 3, No. 3-4, Kluwer Academic Publishers, 1994, 32 pages.
Felzenszwalb, et al., "Efficient Graph-Based Image Segmentation", retrieved on Feb. 9, 2013 at <<http://cs.brown.edu/~pff/papers/seg-ijcv.pdf>>, Journal of International Journal of Computer Vision, vol. 59, No. 2, Sep. 2004, pp. 167-181.
Fergus et al., "Learning Object Categories from Google's Image Search", In Proceedings of Tenth IEEE International Conference on Computer Vision, vol. 2, Oct. 17, 2005, 8 pages.
Flickner et al., "Query by Image and Video Content the QBIC System", IEEE, vol. 28, No. 9, Sep. 1995, 10 pages.
Fonseca, et al., "Sketch-Based Retrieval of Complex Drawings using Hierarchical Topology and Geometry", Butterworth-Heinemann Publisher, Newton, MA, Computer-Aided Design, vol. 41, No. 12, 2009, pp. 1067-1081.
Forbus et al., "CogSketch: Open-domain sketch understanding for cognitive science research adn for education", Eurographics Workshop on Sketch-Based Interfaces and Modeling, 2008, 8 pages.
Frankel, et al., "WebSeer: An Image Search Engine for the World Wide Web", retrieved on Jun. 7, 2010 at <<http://cs-people.bu.edu/athitsos/publications/frankel_webseer.pdf>>, the University of Chicago, Technical Report 96-14, Aug. 1, 1996, pp. 1-24.
Funkhouser, et al., "A Search Engine for 3D Models", retrieved on Jun. 7, 2010 at <<http://www.google.co.in/url?sa=t&source=web&cd=3&ved=0CCQQFjAC&url=http%3A%2F%2Fwww.cs.princeton.edu%2Fgfx%2Fpubs%2FFunkhouser_2003_ASE%2FTOG02.pdf&ei=aeMNTLK5LJP-0gTC6OyWDg&usg=AFQjCNFC3me_dauFBS3-MVrraMAzK_J0mA>>, ACM Transactions on Graphics (TOG), vol. 22, No. 1, Jan. 2003, pp. 83-105.
Gao, et al., "Visual-Textual Joint Relevance Learning for Tag-Based Social Image Search", retrieved on Feb. 9, 2013 at <<http://ieeexplore.ieee.org/stamp/stamp.jsp?tp=&arnumber=6212356>>, IEEE Transactions on Image Processing, vol. 22, No. 1, Jan. 2013, pp. 363-376.
Hammond et al., "A Sketch Recognition Interface that Recognizes Hundreds of Shapes in Course-of-Action Diagrams", in Extended Abstracts on Human Factors in Computing Systems, Apr. 14-15, 2010, pp. 4213-4218.
Hammond, et al., "Ladder, a sketching language for user interface developers", retrieved on Feb. 9, 2013 at <<http://rationale.csail.mit.edu/publications/Hammond2005Ladder.pdf>>, Computers and Graphics, vol. 29, No. 4, Aug. 2005, pp. 518-532.
Hammond et al., "Tahuti: A Geometrical Sketch Recognition System for UML Class Diagrams", in the Proceeding of ACM SIGGRAPH Courses, Article No. 25, 2006, 8 pages.
Hao et al., "Equip Tourists with Knowledge Mined from Travelogues", in Proceedings of the 19th International Conference on World Wide Web, Apr. 26-30, 2010, pp. 401-410.
Hofmann, "Probabilistic Latent Semantic Indexing", in Proceedings of the Twenty-Second Annual International SIGIR Conference Research and Development in Information Retrieval, Aug. 15, 1999, 8 pages.
Hou, et al., "Sketch-based 3D Engineering Part Class Browsing and Retrieval", retrieved on Jun. 7, 2010 at <<https://engineering.purdue.edu/PRECISE/Publications/Sketchbased3DEngineeringPartClassBrowsingandRetriev/Sketch_Euro06.pdf>>, the Eurographics Association, Proceedings of Eurographics Workshop on Sketch-Based Interfaces and Modeling, 2006, pp. 131-138.
Ip, et al., "Affine-invariant Sketch-based Retrieval of Images", retrieved on Jun. 8, 2010 at <<http://ieeexplore.ieee.org/stamp/stamp.jsp?tp=&arnumber=934658>>, IEEE Computer Society, Proceedings of International Conference on Computer Graphics, 2001, pp. 55-61.

Jacobs, et al., "Fast Multiresolution Image Querying", retrieved on Jun. 8, 2010 at <<http://grail.cs.washington.edu/projects/query/>>, ACM, Proceedings of Conference on Computer Graphics and Interactive Techniques (SIGGRAPH), 1995, pp. 277-286.
Jain et al., "Image Retrieval Using Color and Shape", Pattern Recognition Society, vol. 29, No. 8, 1996, 12 pages.
Johnson, et al., "Recognizing Objects by Matching Oriented Points", available at <<http://www.ri.cmu.edu/pub_files/pub2/johnson_andrew_1996_1/johnson_andrew_1996_1.pdf>>,CMU-RI-TR-96-04, 1996, 40 pages.
Kara et al, "An image-based, trainable symbol recognizer for hand-drawn sketches", Computers & Graphics, vol. 29 No. 4, 2005, 17 pages.
Kara, "Automatic Parsing and Recognition of Hand-Drawn Sketches for Pen-Based Computer Interfaces", retrieved on Feb. 9, 2013 at <<http://pdf.aminer.org/000/333/925/on_line_hand_drawn_symbol_recognition_based_on_primitives_separation.pdf>>, Thesis for Doctor of Philosophy (Mechanical Engineering), Carnegie Mellon University, Sep. 2004, 176 pages.
La Cascia et al., "Combining Textual and Visual Cues fo rContent-based Image Retrieval on the World Wide Web", IEEE Workshop on Content-based Access of Image and Video Libraries, Jun. 1998, 5 pages.
Lee, et al., "Shape Discovery from Unlabeled Image Collections", retrieved on Jun. 7, 2010 at <<http://users.ece.utexas.edu/~ylee/shapediscovery/lee_grauman_cypr2009.pdf>>, IEEE Proceedings of Conference on Computer Vision and Pattern Recognition (CVPR), Miami, FL, Jun. 2009, pp. 2254-2261.
Lee, et al., "Sketch-Based Search and Composition of 3D Models", retrieved on Jun. 7, 2010 at <<http://www.cs.princeton.edu/~funk/sbim08.pdf>>, the Eurographics Association, Proceedings of Eurographics Workshop on Sketch-Based Interfaces and Modeling, vol. 2, 2008, pp. 1-8.
Leung, et al., "Retrieval of sketches based on spatial relation between strokes", retrieved on Jun. 8, 2010 at <<http://ieeexplore.ieee.org/stamp/stamp.jsp?tp=&arnumber=1038173>>, IEEE, Proceedings of International Conference on Image Processing (ICIP), New York, NY, vol. 1, 2002, pp. 908-911.
Lew, "Next-Generation Web Searches for Visual Content", Computer, IEEE, vol. 33, No. 11, Nov. 2000, pp. 46-53.
Liang, et al., "Sketch retrieval and relevance feedback with biased SVM classification", retrieved on Jun. 7, 2010 at <<http://cs.nju.edu.cn/szx/papers/ejournals/prl2008-liangshuang.pdf>>, Elsevier Press, Pattern Recognition Letters 29, 2008, pp. 1733-1741.
Ling et al., "Shape Classification Using the Inner-Distance", in IEEE Transactions on Pattern Analysis and Machine Intelligence, vol. 29, Issue 2, Feb. 2007, pp. 286-299.
Marr, "Early Processing of Visual Information", Massachusetts Institute of Technology Artificial Intelligence Laboratory, A.1. Memo No. 340, Dec. 1975, 67 pages.
Marr, "Early Processing of Visual Information", Phil. Trans. R. Soc. Lond. B 1976, 275, Oct. 19, 1976, retrieved from <<rstb.royalsocietypublishing.org>> on Apr. 11, 2013, 44 pages.
Martin, et al., "Learning to Detect Natural Image Boundaries Using Local Brightness, Color, and Texture Cues", retrieved on Jun. 7, 2010 at <<http://www.cs.berkeley.edu/~malik/papers/MFM-boundaries.pdf>>, IEEE Computer Society, Transactions on Pattern Analysis and Machine Intelligence, vol. 28, No. 5, May 2004, pp. 530-549.
Mikolajczyk et al, "Shape Recognition with Edge-Based Features", in British Machine Vision Conference, Dec. 20, 2010, 10 pages.
Mori et al., "Efficient Shape Matching Using Shape Contexts", in IEEE Transactions on Pattern Analysis and Machine Intelligence, vol. 27, Issue 11, Nov. 2005, pp. 1832-1837.
Newman et al., "Denim: Finding a Tighter Fit Between Tools adn Practice for Web Site Design", in Proceedings of the SIGCHI Conference on Human Factors in Comoputing Systems, Jan. 1, 2000, 9 pages.
Office action for U.S. Appl. No. 12/873,007, dated Feb. 1, 2013, Wang et al., "Sketch-Based Image Search", 16 pages.
Office action for U.S. Appl. No. 12/873,007, dated Sep. 19, 2013, Wang, et al., "Sketch-Based Image Search", 18 pages.

(56) References Cited

OTHER PUBLICATIONS

Office action for U.S. Appl. No. 13/886,862, dated Nov. 14, 2014, Wang et al., "Sketch Segmentation", 10 pages.

Office Action for U.S. Appl. No. 13/886,904, dated Dec. 23, 2014, Wang et al., "Informational Notice to Applicant", 10 pages.

Office action for U.S. Appl. No. 12/873,007, dated Dec. 24, 2014, Wang, et al., "Sketch-Based Image Search", 22 pages.

Non-Final Office Action for U.S. Appl. No. 12/873,007, dated Jun. 30, 2014, Changhu Wang et al., "Sketch-Based Image Search", 22 pages.

Olson, et al., "Automatic Target Recognition by Matching Oriented Edge Pixels", IEEE Transactions on Image Processing, vol. 6, No. 1, IEEE, 1997, pp. 103-113

Paquet et al., "Description of shape information for 2-D and 3-D Objects", in Proceeding of Signal Processing: Image Communication, vol. 16, Issue 1-2, 2000, pp. 103-122.

Paulson et al., "PaleoSketch: Accurate Primitive Sketch Recognition and Beautification", in Proceedings of the International Conference on Intelligent User Interfaces, retrieved at <<http://scholar.googleusercontent.com/scholar?q=cache:niUE13zqoIMJ:scholar.google.com/>> on Feb. 19, 2013, 14 pages.

PCT Search Report and Written Opinion dated Nov. 17, 2014 for PCT Application No. PCT/US14/36471, 12 Pages.

PCT Search Report dated Feb. 17, 2012 for PCT application No. PCT/US2011/047817, 11 pages.

Pu, et al., "Automated Freehand Sketch Segmentation Using Radial Basis Functions", retrieved on Feb. 9, 2013 at <<http://www.ncbi.nlm.nih.gov/pmc/articles/PMC2782822/pdf/nihms120688.pdf>>, Journal of Computer-Aided Design, vol. 41, No. 12, Dec. 1, 2009, pp. 857-864.

Rosen-Zvi et al., "The Author-Topic Model for Authors and Documents", in Proceedings of the 20th Conference on Uncertainty in Artificial Intelligence, 2004, pp. 487-494.

Sagar, et al., "Content-based Image Retrieval System Implementation Using Sketches", retrieved on Feb. 9, 2013 at <<http://ijrct.org/documents/1000005.pdf>>, International Journal of Research and Computer Science Applications, vol. 2, No. 2, May 2012, 8 pages.

Sciascio et al., "Content-Based Image Retrieval over the Web Using Query by Sketch and Relevance Feedback", Visual information and Information Systems Lecture Notes in Computer Science, vol. 1614, 1999, 8 pages.

Sebastian et al., "Recognition of Shapes by Editing their Shock Graphs", in IEEE Transactions on Pattern Analysis and Machine Intelligence, vol. 26, Issue 5, May 2004, pp. 550-571.

Sezgin, "Feature Point Detection and Curve Approximation for Early Processing of Free-Hand Sketches", retrieved on Feb. 9, 2013 at <<http://rationale.csail.mit.edu/publications/Sezgin2001Feature.pdf>>, Thesis for Master of Science, Massachusetts Institute of Technology, Department of Electrical Engineering and Computer Science, May 2001, 77 pages.

Sezgin, et al., "HMM-Based Efficient Sketch Recognition", retrieved onn Feb. 9, 2013 at <<http://citeseerx.ist.psu.edu/viewdoc/download?doi=10.1.1.94.6774&rep=rep1&type=pdf>>, Proceedings of Intl Conference on Intelligent User Interfaces (IUI), Jan. 10, 2005, pp. 281-283.

Sezgin, et al., "Sketch Based Interfaces: Early Processing for Sketch Understanding", retrieved on Feb. 9, 2013 at <<http://www.ai.mit.edu/projects/oxygen/oxygen-book2001/Section4-Perceptual-Interfaces/PI-11.pdf>>, Proceedings of Workshop on Perceptual User Interfaces (PUI), May 2001, pp. 623-641.

Shi, et al., "Normalized Cuts and Image Segmentation", retrieved on Feb. 9, 2013 at <<http://ieeexplore.ieee.org/stamp/stamp.jsp?tp=&arnumber=868688>> Transactions on Pattern Analysis and Machine Intelligence (PAMI), vol. 22, No. 8, Aug. 2000, pp. 888-905.

Shotton, et al., "Multi-Scale Categorical Object Recognition Using Contour Fragments", retrieved on Jun. 7, 2010 at <<http://research.microsoft.com/pubs/117886/pami07.pdf>>, IEEE Computer Society, Transactions on Pattern Analysis and Machine Intelligence, vol. 30, No. 7, Jul. 2008, pp. 1270-1281.

Shotton, et al., "Multiscale Categorical Object Recognition Using Contour Fragments", IEEE Transactions on Pattern Analysis and Machine Intelligence, vol. 30, No. 7, 2008, IEEE, pp. 1270-1281.

Sivic et al., "Video Google: A Text Retrieval Approach to Object Matching in Videos", Proceedings of the Ninth IEEE International Conference on Computer Vision(ICCV 2003), 2-Volume Set, 2003, 8 pages.

Smith, et al., "VisualSEEk: a fully automated content-based image query", retrieved on Jun. 7, 2010 at <<http://www.ctr.columbia.edu/papers_advent/96/smith96f.pdf>>, ACM, Proceedings of International Conference on Multimedia (MM), Boston, MA, 1996, pp. 87-98.

Sousa, et al., "Sketch-Based Retrieval of Drawings using Topological Proximity", retrieved on Jun. 7, 2010 at <<http://vimmi.inesc-id.pt/publication.php?publication_id=292>>, Proceedings of International Conference on Distributed Multimedia Systems, Special Track on Sketch Computing (DMS), Boston, MA, 2008, pp. 276-281.

Stahovich, "Sketchit: A Sketch Interpretation Tool for Conceptual Mechanism Design", in A.I. Technical Report No. 1573, Mar. 1996, 207 pages.

Stenger, et al., "Model-Based Hand Tracking Using a Hierarchical Bayesian Filter", retrieved on Jun. 8, 2010 at <<http://ieeexplore.ieee.org/stamp/stamp.jsp?tp=&arnumber=1661541>>, IEEE Computer Society, Transactions on Pattern Analysis and Machine Intelligence, vol. 28, No. 9, Sep. 2006, pp. 1372-1384.

Sun, et al., "Query-Adaptive Shape Topic Mining for Hand-Drawn Sketch Recognition", retrieved on Feb. 9, 2013 at <<http://dl.acm.org/citation.cfm?id=2393347.2393421>>, Proceedings of ACM Intl Conference on Multimedia (MM), Oct. 29, 2012, pp. 519-528.

Tamrakar, et al., "No Grouping Left Behind: From Edges to Curve Fragments", in: IEEE 11th Int'l Conf. Computer Vision, 2007. Available at: IEEE.

Temlyakov, et al., "Two Perceptually Motivated Strategies for Shape Classification", retrieved on Feb. 9, 2013 at <<http://ieeexplore.ieee.org/stamp/stamp.jsp?tp=&arnumber=5539912>>, IEEE Conference on Computer Vision and Pattern Recognition (CVPR), Jun. 18, 2010, pp. 2289-2296.

Tieu et al., "Boosting Image Retrieval", Kluwer Academic Publisher, 2004, International Journal of Computer Vision 56 (112), pp. #17-pp. #36.

Ullman et al., "Structural Saliency—the Detection of Globally Salient Structures Using a Locally Connected Network," MIT AI Lab., A.1. Memo No. 1061 (1988). Available at: http://dspace.mit.edu/handle/1721.1/6493#files-area.

Wang, et al., "From Fragments to Salient Closed Boundaries: An In-Depth Study", retrieved on Jun. 7, 2010 at <<http://www.cse.sc.edu/~songwang/document/cvpr04a.pdf>>, IEEE Computer Society, Proceedings of Conference on Computer Vision and Pattern Recognition (CVPR), vol. 2, 2004, pp. 291-298.

Wang, et al., "MindFinder: Image Search by Interactive Sketching and Tagging", International World Wide Web Conference Committee 2010, Apr. 26-30, 2010,, Raleigh, NC, USA, pp. 1309-1311.

Wang, et al., "Sketch2Cartoon: Composing Cartoon Images by Sketching", retrieved on Feb. 9, 2013 at <<http://research.microsoft.com/pubs/151260/td36c-wangPS.pdf>>, Proceedings of ACM Intl Conference on Multimedia (MM), Nov. 28, 2011, pp. 789-790.

Wertheimer, "Laws of Organization in Perceptual Forms", retrieved on Mar. 4, 2013 at <<http://psychclassics.yorku.ca/Wertheimer/Forms/forms.htm>>, Psycologische Forschung (Gestalt Psychology), vol. 4, 1923, pp. 301-350. (English translation: A source book of Gestalt psychology, 1938, pp. 71-88).

Westman, et al., "Search Strategies in Multimodal Image Retrieval", retrieved on Jun. 7, 2010 at <<http://delivery.acm.org/10.1145/1420000/1414700/p13-westman.pdf?key1=1414700&key2=9140935721&coll=Guide&dl=GUIDE&CFID=90342082&CFTOKEN=83466007>>, ACM, Proceedings of Conference on Information Interaction in Context, (IIiX), London, UK, 2008, pp. 13-20.

(56) References Cited

OTHER PUBLICATIONS

Yang, "Sketch-based Modeling of Parameterized Objects", retrieved on Feb. 9, 2013 at <<http://www.cs.ubc.ca/labs/imager/th/2006/ChenMscThesis/Chen.pdf>>, Thesis for Master of Science, University of British Columbia, Apr. 2006, 70 pages.

Yao, et al., "Natural Image Retrieval with Sketches", 2005 IEEE International Conference on Multimedia and Expo (ICME), pp. 1199-1201.

Yu et al., "A Domain-Independent System for Sketch Recognition", the Association for Computing Machinery, Inc., State Key Laboratory of Software Novel Technology, Nanjing University, China, 2003, pp. 141-146.

Yun et al., "Shape Representation Robust to the Sketching Order Using Distance Map and Direction Histogram", Springer-Verlag Berlin Heidelberg, LNCS 5342, 2008, 10 pages.

Zhang et al., "A Comparative Study of Fourier Descriptors for Shape Representation and Retrieval", in the 5th Asian Conference on Computer Vision, Jan. 23-25, 2002, 6 pages.

Zhuang et al., "Interactive High-Dimensional Index for Large Chinese Calligraphic Character Databases", ACM Trans. Asian Lanuage Information Processing, vol. 6 No. 2, Article 8, Sep. 2007, 31 pages.

Berretti, et al, "Retrieval by Shape Similarity with Perceptual Distance and Effective Indexing", IEEE Transactions on Multimedia, vol. 2, No. 4, Dec. 1, 2000, 16 pages.

European Office Action dated Nov. 18, 2015 for European patent application No. 11822334.6, a counterpart foreign application of U.S. Appl. No. 12/873,007, 8 pages.

European Supplementary Search Report dated Nov. 3, 2015 for European patent application No. 11822334.6, 3 pages.

Jain, et al., "Shape-Based Retrieval: A Case Study with Trademark Image Databases", Pattern Recognition, vol. 31, No. 9, Sep. 1, 1998, pp. 1369-1390.

Nomir, "Hierarchical Dental X-Ray Radiographs Matching", IEEE International Conference on Image Processing, Oct. 1, 2006, pp. 2677-2680.

Office action for U.S. Appl. No. 12/873,007, dated Mar. 15, 2016, Wang et al., "Sketch-Based Image Search", 22 pages.

\* cited by examiner

HAND-DRAWN SKETCH RECOGNITION

RELATED APPLICATIONS

This application claims priority to and is a continuation of U.S. patent application Ser. No. 13/886,904, filed on May 3, 2013, entitled "HAND-DRAWN SKETCH RECOGNITION," now issued U.S. Pat. No. 9,147,125, the entire contents of which are incorporated herein by reference.

BACKGROUND

With the increased prevalence of electronic imaging devices and the Internet, billions of images have become publically available and searchable online. However, many images do not include an accurate description or tagging, increasing the difficulty of identifying such images using typical keyword techniques. Consequently, when a user desires to locate an image having particular features, conventional text-based search engines that rely on short text queries are often unable to locate desired images in a timely and efficient manner. Thus, in some cases, a hand-drawn sketch may be used as at least part of a search query for locating a desired image. However, machine identification of the subject of hand-drawn sketches can be difficult. Additionally, while image-based searching of image collections has been intensively studied, little progress has been made in developing practical large-scale sketch-based recognition techniques.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations herein provide techniques for performing sketch recognition. For instance, a large database or collection of images and associated text is collected to form a knowledge base for sketch recognition. In some cases, the collection of images is segmented into object topics, which represent the kind of object that occurs in the collection (i.e., a sun, a sail boat, a bottle, etc.) and shape topics, which represents a certain shape of the objects within the object topic (i.e., a sail boat with one sail, a sail boat with two sails, etc.). As one example, a probabilistic topic model or a query-adaptive shape topic model (QST) is utilized to mine object topics and shape topics related to a sketch.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

The disclosed techniques describe implementations of a sketch recognition system. In real-world cases, an interactive user interface or touch screen may be implemented to receive a user's free form sketch. For example, the user interface may include a panel or window, which enables the user to compose a drawing or sketch. In one implementation, collections of images are utilized to aid in sketch recognition. For example, a clipart database may be utilized, as many clip art images are hand-drawn and the contours of clipart images are often similar to those of hand-drawn sketches. Further, clipart images are typically already associated with textual-based user assigned categories, tags, labels, or the like. Additionally, an image-based search engine may be leveraged to identify images similar to the user's sketch from the collections.

In one implementation, sketches are associated with an object topic and a shape topic. As used herein an "object topic" represents the kind of object or category of objects that a sketch is associated with (i.e., a sun, a sail boat, a bottle, etc.) and a "shape topic" represents a category of shape within the object topic associated with the sketch (i.e., a sail boat with one sail, a sail boat with two sails, etc.). A shape topic for each variation in shape associated with images falling within an object topic is associated with the object topic. Thus, multiple shape topics may be associated with each object topic and similar shape topics may be associated with two individual object topics. For example, a shape topic such as "round sketches" may be associated with the object topic "sun" and the object topic "light bulb." Since sketches are typically simple drawings, a sketch is associated with a single object topic and a single shape topic.

In one particular implementation, a query-adaptive shape topic (QST) model is utilized for sketch recognition. The QST model utilizes a layered approach including a layer of object topics and a layer of shape topics. By utilizing the layered approach, shape variation and shape ambiguity may be significantly reduced.

Illustrative Environment

Figure 1:
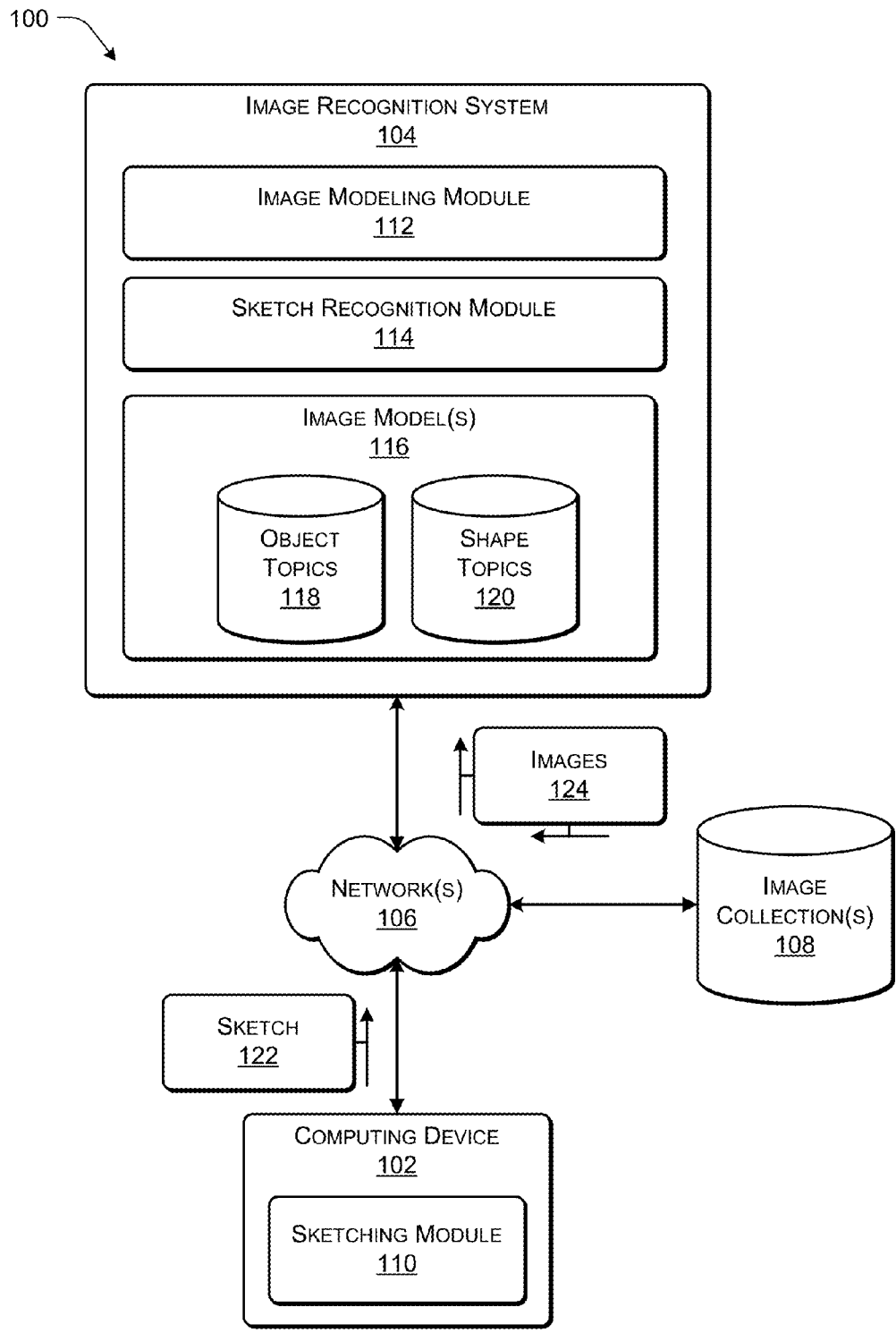
FIG. 1 shows an illustrative computing architecture for recognizing sketches according to some implementations

FIG. 1 shows an illustrative computing architecture 100 for recognizing sketches according to some implementations. The architecture 100 includes one or more computing devices 102 in communication with an image recognition system 104 via one or more networks 106. The architecture 100 may also include one or more image collections 108 accessible to the image recognition system 104 either locally on the same computing device, or over the network 106. Further, while the example of FIG. 1 shows a sketching module 110 communicating with the image recognition system 104 over the network 106, in other examples, the sketching module 110 may be executed on the same computing device as the image recognition system 104.

As illustrated, the computing device 102 includes the sketching module 110. The sketching module 110 is configured to receive user inputs and to interpret the user inputs as hand-drawn sketches. For example, the sketching module 110 may receive user inputs via a touch screen or other input device, such as for an interactive drawing game, a search engine interface, etc., The sketching module 110 may convert the user inputs into a sketch and provide the sketch to the image recognition system 104 for identification.

The image recognition system 104 includes an image modeling module 112 and a sketch recognition module 114. The image modeling module 112 is configured to analyze image collections 108 and to generate an image model 116 including object topics 118 and shape topics 120. In one example, the image modeling module 112 may model the images of the image collections 108 based on a probabilistic topic model, such as a query-adaptive shape topic (QST) model. The sketch recognition module 114 is configured to utilize the image model 116 to generate a text-based tag or label for the sketch 122.

The image model 116 may be used to predict text-based tags or labels for the sketch 122 based on a set of images 124 returned as a search result from an image-based search. The image model 116 includes both the object topics 118 and the shape topics 120. The object topics 118 represent the kind of objects or categories of objects that a sketch is associated with and the shape topics 120 represent variations of shapes within each of the object topics.

The image collection 108 may include one or more collections of images publicly available on the web or private collections accessible by the computing device 102. For example, the image collection 108 may include one or more clipart collections. Clipart collections are particularly suited for generating the object topics 118 and the shape topics 120, as the contours of the clipart images have a similar style to hand-drawn sketches and many of these images have been tagged or include some type of associated text, which may be utilized in addition to the images by the image modeling module 112 to generate the object topics 118 and the shape topics 120.

In one implementation, a user traces strokes on an input interface, such as a touch screen (not shown in FIG. 1), of the computing device 102 and the sketching module 110 converts the strokes into a sketch 122. The sketch 122 is provided to the image recognition system 104 via network 106 for identification. For example, the sketch 122 may be provided to the image recognition system 104 as part of an image tagging system associated with one or more social networking or image sharing websites. In another example, the sketch 122 may be tagged and indexed as part of a searchable image collection. As another example, the subject of the sketch 122 may be recognized using the techniques herein, and the sketch and the recognized subject may be used to search for related images, such as within the image collection 108 (e.g., clipart), or for natural images within the framework of a commercial search engine.

The image recognition system 104 receives the sketch 122 and executes the image modeling module 112 to generate the image model 116. The image model 116 is utilized to identify the subject of the sketch 122. The image model 116 includes both object topics 118 and shape topics 120. To generate the object topics 118 and the shape topics 120, the image modeling module 112 searches the image collections 108 using the sketch 122, as a query. For example, an image-based search technology may be leveraged to locate images 124 visually similar to the sketch 122. In one implementation, the image-based search engine ranks the images 124 of the image search based on similarity to the sketch 122.

The image modeling module 112 filters out complex images (i.e., images with more than one object), such that the images remaining are of a single subject. As discussed above, the images of the image collections 108 may be tagged or include some type of text-based identification. The remaining images 124 and text associated with the images 124 are used as inputs to generate the object topics 118 and the shape topics 120, for example, according to a QST model.

The image modeling module 112 derives a shape feature from each of the images 124 and associates the image with the shape topic 120 corresponding to the shape feature. The shape feature is a mathematical representation of the shape of the object within a given image. For example, each of the images 124 are associated with a shape topic 120 by taking a probability that the shape feature of the image 124 belongs to a given shape topic 120. The shape topic 120, which results in the highest probability, is selected as the shape topic 120 for the image 124. In some implementations, the sketch 122 is utilized to influence the possibility of generating a shape feature for a given shape topic 120. By utilizing the sketch 122 as an additional input to the shape features, the discovered shape topics 120 of the image model 116 become more relevant to the sketch recognition module 114.

Each shape topics 120 is associated with one of the object topics 118. A shape topic 120 is associated with an object topic 118 by taking the probability, for each of the object topics 118, that the shape topic 120 belongs to the object topic 118. The object topics 118 are ranked based on the resulting probabilities and the shape topic 120 is associated with the object topic 118 with the highest ranking. In this way, each image 124 returned by the image-based search engine is associated with a shape topic 120 and each shape topic is associated with an object topic 118.

Once all of the images 124 are associated with one of the shape topics 120 and the shape topics 120 are associated with one of the object topics 118, a word distribution is determined for the each of the object topics 118. Each object topic 118 represents both visual information (such as the shape topics 120) and semantic information (such as the tags, metadata, labels, captions and/or text surrounding the images 124). The semantic information is analyzed in conjunction to the visual information to determine the word distribution under each of the object topics 118.

The sketch recognition module 114 selects a tag for the sketch 122 from the word distribution. For example, the probability that each word or phrase represents the subject of the sketch 122 may be determined based on the visual information and the word distributions. The words are ranked based on the probabilities and the top ranking word or phrase is selected by the sketch recognition module 114, as the tag or label for the sketch 122. The tagged sketch 122 may be stored for use in image searches, presented to one or more users over an image sharing or social networking website and/or indexed and returned to the user.

Figure 2:
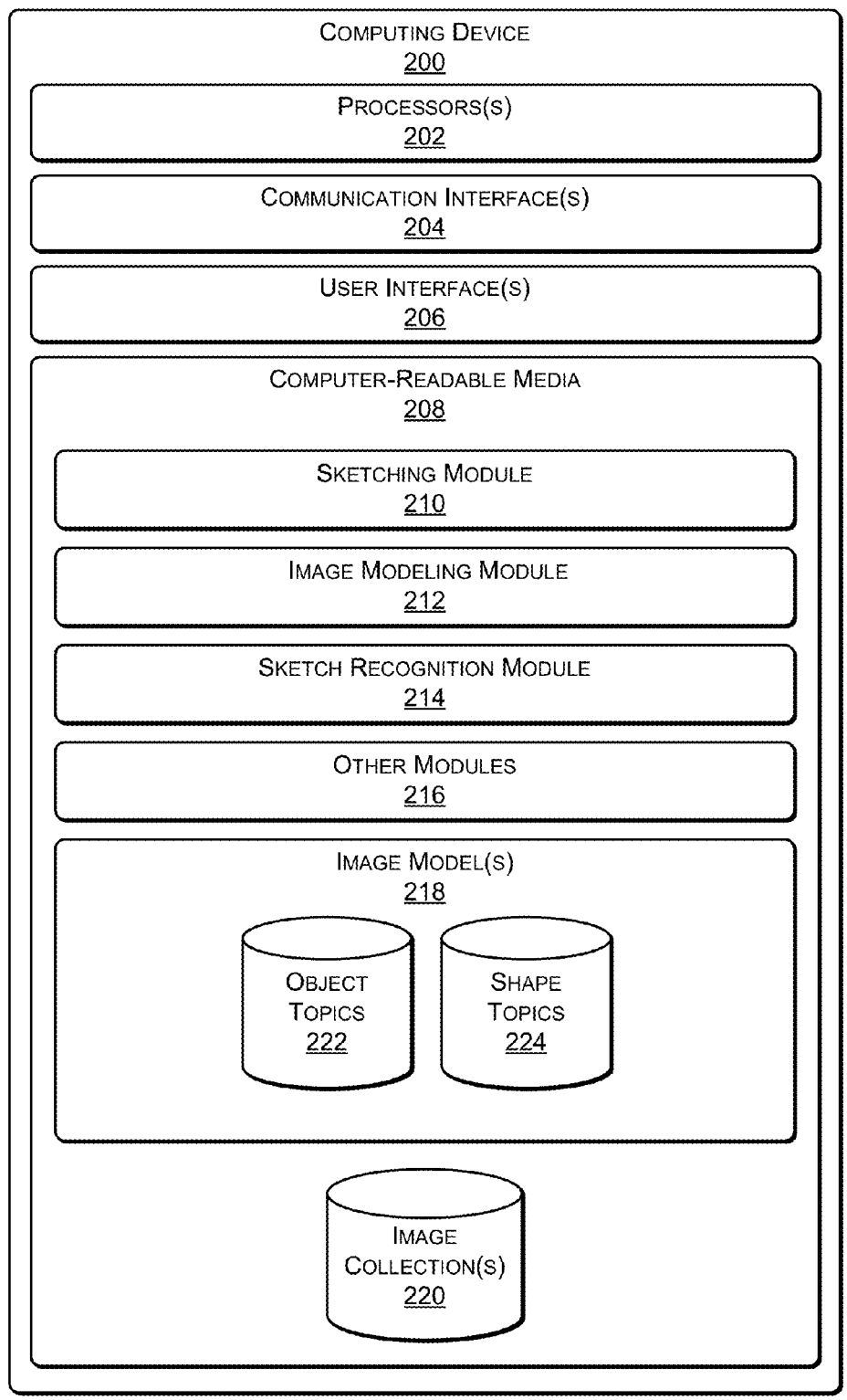
FIG. 2 is a block diagram of an example framework of a computing device according to some implementations.

FIG. 2 is a block diagram of an example framework of a computing device 200 according to some implementations. The computing device 200 may be a tablet computer, cell phone, smart phone, desktop computer, notebook computer, among other types of computing devices. In the illustrated example, the computing device 200 includes, or accesses, components such as one or more processors 202, one or more communication interfaces 204 and one or more user interfaces 206, in addition to various other components. In some examples, the processors 202 may be one or more control logic circuits, central processing units, processing cores or general purpose processors. The processors 202 are configured to access one or more computer-readable media 208 to perform the function of the computing device 200.

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible medium that can be used to store information for access by the computing device 200.

In contrast, communication media may embody computer-readable instructions, data structures, program modules, or other data in a modulated data signal, such as a carrier wave. As defined herein, computer storage media does not include communication media.

Several modules such as instructions, data structures, and so forth may be stored within the computer-readable media 208 and configured to execute on the processors 202. A sketch modeling module 210, an image modeling module 212 and a sketch recognition module 214 are provided to identify a subject of a sketch. Various other modules 216 may also be stored on computer-readable storage media 208, such as an operating system module.

In some implementations, the computer-readable media 208 may also store one or more image models 218 and/or image collections 220. The image models 218 are generated by the image modeling module 212 and include multiple object topics 222 and shape topics 224. The object topics 222 represent the kind of object or category of objects that a sketch is associated with and the shape topics 224 represent the variations of shapes within each of the object topics.

The image collections 220 may be one or more collections of categorized hand-drawn sketches or images, such as clipart. The image collections 220 are searched by one or more image-based search engines stored on the computer-readable storage media 208, for example, as part of the image modeling module 212. In the illustrated example, the image collections 220 are stored on computer-readable storage media 208. In other implementations, the image collections 220 may be stored on one or more remote servers and accessed by the computing device 200 and accessed, e.g., via the Internet.

The communication interfaces 204 facilitate communication between one or more networks (such as networks 106 of FIG. 1) and/or one or more cloud services. The communication interfaces 204 may support both wired and wireless connection to various networks, such as cellular networks, radio, WiFi networks, short-range or near-field networks (e.g., Bluetooth®), infrared signals, local area networks, wide area networks, the Internet, and so forth.

The user interfaces 206 are configured to receive user inputs, such as a sketch, and to provide outputs to the user, such as the tagged sketch. For instance, the user interfaces 206 may include one or more input components, such as keyboards, keypads, joysticks, a mouse, a touch screen, touch pad, drawing pad, or control buttons, as well as one or more output components, such as a display. In one particular implementation, the user interfaces 206 may include one or more touch screens to enable a user to sketch an image and/or edit an image by inputting one or more strokes to a touch sensor.

In one example, a user traces strokes on the user interface 206 using the sketching module 210. The strokes are interpreted as a sketch by the sketching module 210. For example, the user may be editing an image using the sketching module 210 by adding a line segment represented by the strokes traced on the user interfaces 206. The computing device 200 may determine what the object of sketch is based on the strokes and an image model 218 generated based on the sketch.

The computing device 200 executes the image modeling module 212 to generate the image model 218. The image modeling module 212 searches the image collections 220 using the sketch as a query. For example, an image-based search engine may be leveraged to locate images with feature shapes similar to those of the sketch.

The image modeling module 212 derives a shape feature from each of the images returned by the image-based search engine. Each of the images are associated with a shape topic 224 by taking a probability that the shape feature derived from the image belongs to a given shape topic 224. Each of the shape topics 224 are associated with an object topic 222 by taking a probability that the shape topic 224 belongs to a given object topic 222. In this way, each image returned by the image-based search engine is associated with a shape topic 224 and each of the shape topics is associated with an object topic 222.

Visual information and semantic information are identified for each of the object topics 222. For example, the shape features of each of the shape topics 224 associated with the object topic 222 may be utilized as the visual information and the text associated with the images may be analyzed to determine the most commonly occurring words under each object topic 222. A word distribution for each of the object topics 222 is derived from the most commonly occurring words.

Once the images are converted into the image model 218, the sketch recognition module 214 may identify one of the words associated with the object topics 222 as a tag or label for the sketch. For example, the word with the highest frequency of occurrence may be selected. In one particular implementation, each word with a frequency of occurrence above a threshold may be associated with the sketch as descriptive information.

Figure 3:
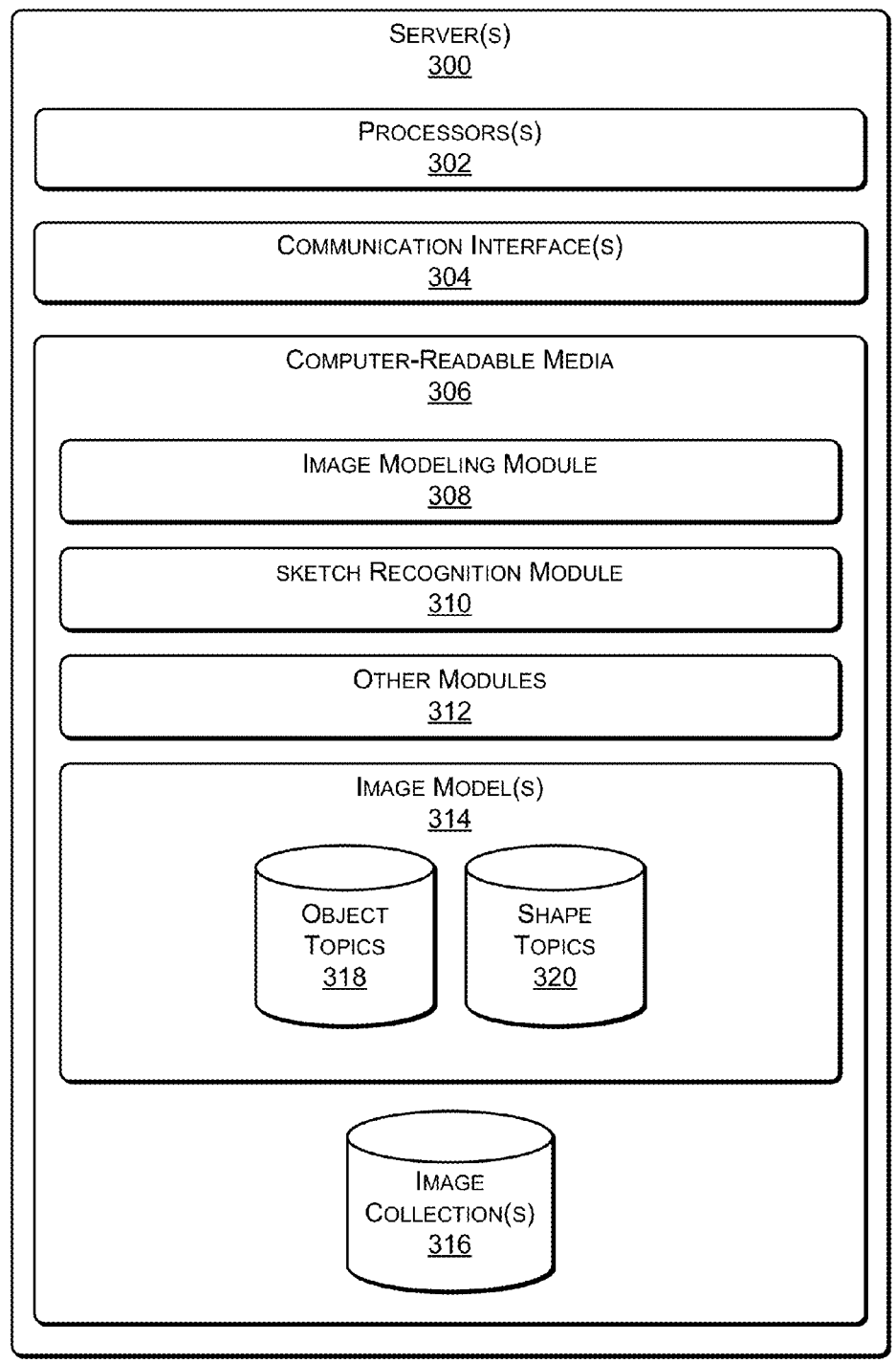
FIG. 3 is a block diagram of an example framework of a server according to some implementations.

FIG. 3 is a block diagram of an example framework of a server 300 according to some implementations. In the illustrated example, the server 300 includes components such as one or more processors 302, one or more communication interfaces 304 and one or more computer-readable media 306 to perform the function of the server 300. The server 300 may include any number of servers arranged in any number of ways, such as server farms, stacks, and the like that are commonly used in data centers.

Several modules such as instruction, data stores, and so forth may be stored within the computer-readable media 306 and configured to execute on the processors 302. An image modeling module 308 and a sketch recognition module 310 are provided to tag or label sketches. Various other modules 312 may also be stored on computer-readable storage media 306, such as an operating module.

In some implementations, the computer-readable media 306 may also store one or more image models 314 and/or image collections 316. The image models 314 are generated by the image modeling module 308 and include multiple object topics 318 and shape topics 320. The image module 314 also includes multiple images with associated text. The images are associated with the shape topics 320 and the shape topics 320 are associated with the object topics 318 based on one or more shape features derived from the each image returned from the image-based search engine.

The image collections 316 may be one or more collections of categorized images. The image collections 316 are searched by one or more image-based search engines stored in the computer-readable storage media 306, for example, as part of the image modeling module 308.

The communication interfaces 304 facilitate communication between one or more computing devices (such as computing device 200 of FIG. 2) via one or more networks (such as network 106 of FIG. 1). The communication interfaces 304 may support both wired and wireless connection to various networks, such as cellular networks, radio, WiFi networks, short-range or near-field networks (e.g., Bluetooth®), infrared signals, local area networks, wide area networks, the Internet, and so forth.

Generally, the servers 300 receive sketches at the communication interfaces 304, for example, from a computing device (such as computing device 200 of FIG. 2). In various implementations, the servers 300 access the image collections 316, generate the image model 314 and identify the subject of the sketches. In one example, the servers 300 execute the image modeling module 308 to generate the image model 314. To generate the image model 314, the image modeling module 308 searches the image collections 316 using the sketch as a query. For example, an image-based search engine may be leveraged to locate images with shape features similar to those of the sketch.

The image modeling module 308 derives a shape feature from each of the images and associates each image with a shape topic 320 by taking a probability that the shape feature derived from the image belongs to a given shape topic 320. The shape topics 320 are ranked based on the probabilities and the image is associated with the highest ranking shape topic 320.

The shape topics 320 are associated with object topics 318. A shape topic 320 is associated with an object topic 318 by taking the probability that the shape topic 320 belongs to each of the object topics 318. The object topics 318 are ranked based on the probabilities and the shape topic 320 is associated with the highest ranking object topic 318.

Visual information and semantic information are identified for each of the object topics 318. For example, the shape features of each of the shape topics 320 associated with the object topic 318 may be utilized as the visual information and the text associated with the images may be analyzed to determine a word distribution for each of the object topics 318.

The sketch recognition module 310 identifies one of the words associated with the object topics 318 as a tag for the sketch. For example, the probability that each of the words from the word distributions represent the sketch may be calculated and the word with the highest probability may be selected, as the tag or the label for the sketch.

In one implementation, the probability, $p(w=w_m|sketch)$, that a word applies to the sketch given the image model 314 with object topics 318 may be expressed as follows:

$$p(w = w_m \mid \text{sketch}) = \sum_{n=1}^{N} p(I_n) \sum_z p(w = w_m \mid z, \beta) p(z \mid I_n) \quad (1)$$

where the image model 314 is formed from N images $\{I_1, I_2, \ldots, I_N\}$ and z denotes the object topics 318 having M words $\{w_1, w_2, \ldots, w_M\}$. Once the probabilities are calculated for each of the M words, the M words are ranked and the top ranking word w is selected as the tag for the sketch.

Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), etc.

Illustrative Examples

Figure 4:
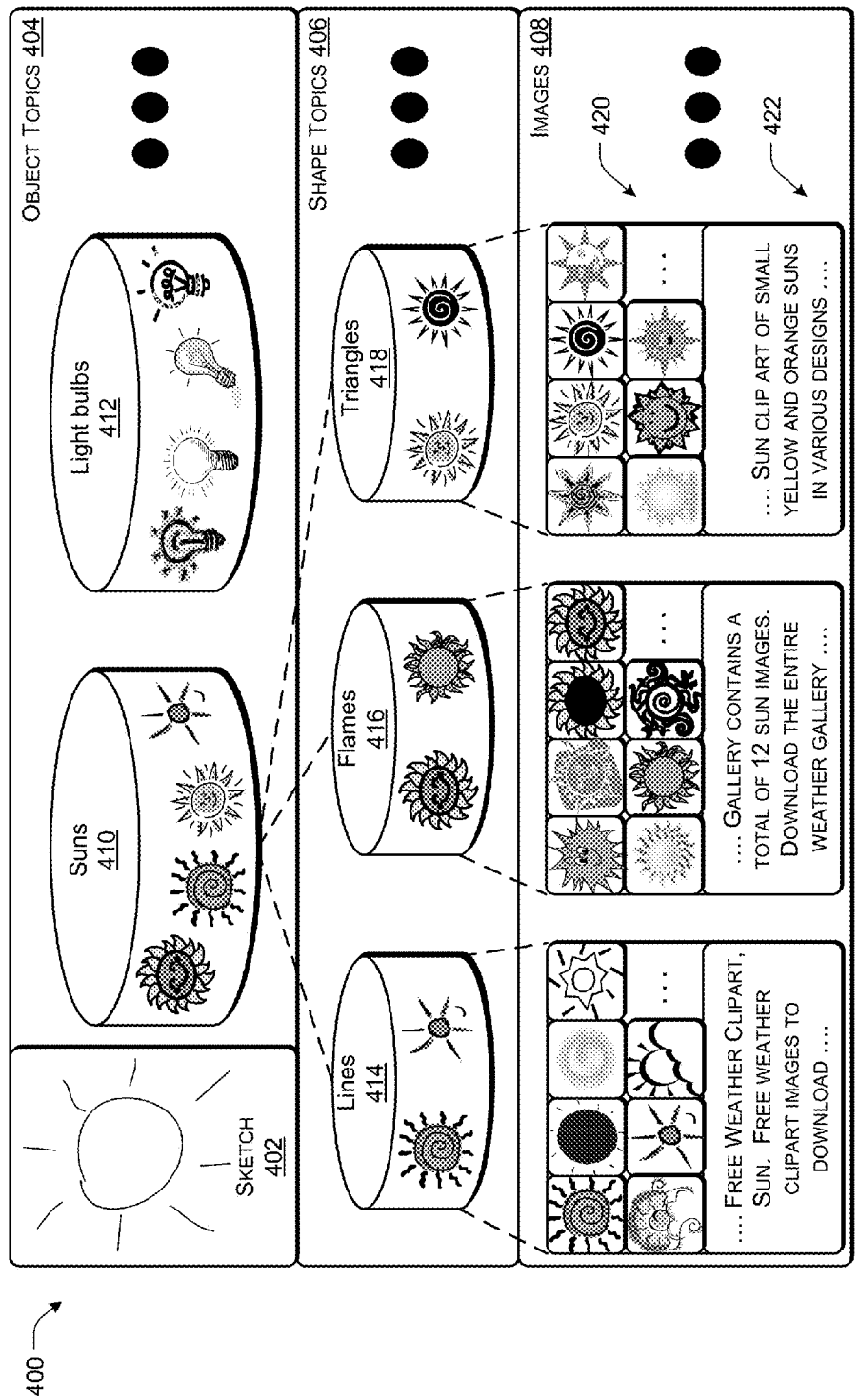
FIG. 4 is a pictorial view of a graphical example of the shape topics and object topics generated based on a sketch according to some implementations.

FIG. 4 is a pictorial view of a graphical example 400 of the shape topics and object topics generated based on a sketch 402 according to some implementations. The object topics and shape topics are shown in layers. The first layer is the object topic layer 404, the second layer is the shape topic layer 406 and the third layer is the image layer 408. The object topic layer 404 is the high level representation of the images returned by the image-based search engine in response to submitting the sketch 402, as a query. That is, the object topic layer 404 represents the categories of the sketch 402. For instance, in the graphical example 400, two object topics are generated from the input sketch 402, the object topic 410 associated with "suns" and the object topic 412 associated with "light bulbs." Each of the object topics 410 and 412 are associated with one or more shape topics.

The shape topic layer 406 is a second level representing the images returned by the image-based search engine. The shape topic layer 406 represent a shape feature of the images of the object topics 410 or 412 associated with the sketch 402. Thus, the shape topic layer has a shape topic for each variation in shape associated with images of each object topic. For instance, in the illustrated example, shape topics 414, 416 and 418 are associated with the object topic 410. The shape topic 414 represents a shape feature associated with "lines around the center circle," the shape topic 416 represents a shape feature associated with "flames around the center circle" and the shape topic 418 represents a shape feature associated with "triangles around the center circle." Each of the shape topics 414, 416 and 418 are associated with one or more images 420, which have the shape feature represented by the corresponding shape topic. Thus, as shown in the illustrated example, each of the shape topics 414, 416 and 418 include images 420, which have the shape feature associated with the shape topic.

In one example, an image I has a shape feature defined by $r_1$ and the model generate from the sketch 402 has shape topics $S=\{s_1, s_2, \ldots, s_i\}$ and object topics $Z=\{z_1, z_2, \ldots, z_i\}$. The shape topic that the image I belongs to may be determined by taking the probability $p(r_1|s_i)$ for each of the shape topics S. The shape topics S may be ranked according to the calculated probabilities and the image I may be associated with the highest ranking shape topic. Likewise, a shape topic $S_i$ may be associated with one of the object topics Z by determining the probability $p(s|z_i)$ for each of the object topics Z. The object topics Z may also be ranked according to the calculated probabilities and the shape topic $S_i$ may be associated with the highest ranking object topic.

Once the images 420 are associated with a shape topic and the shape topics are associated with an object topic, the object topics may be utilized to generate both visual information and semantic information. As each of the images 420 has a shape feature, which is represented by the shape topics, each of the object topics may be associated with a set of shape features represented by the shape topics. Additionally, each of the images 420 are also associated with some type of text 422, such as a tag, a label, metadata, a caption or text surrounding the image in one or more media content items. The text 422 may be used to generate the semantic information associated with the object topics 410 and 412. For example, the text 422 may be mined for the most commonly occurring words. The words are ranked according to frequency of occurrence and the top ranking words may be used as the semantic information related to a given object topic 410 or 412.

Figure 5:
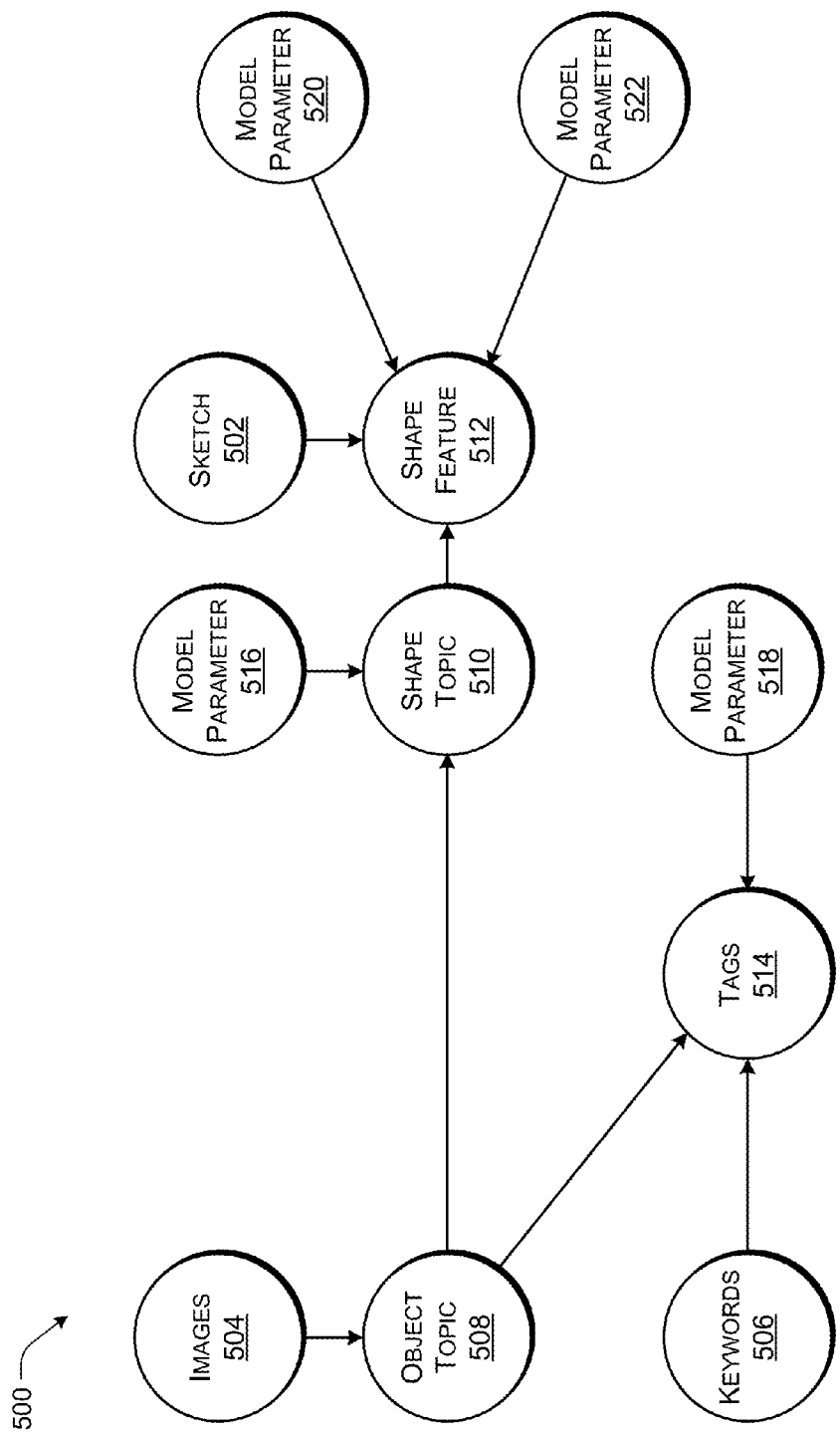
FIG. 5 is a block diagram of an example graphical representation of a query-adaptive shape topic according to some implementations.

FIG. 5 is a block diagram of an example graphical representation of a query-adaptive shape topic (QST) 500 according to some implementations. The QST 500 may be utilized to generate a model given a sketch 502. While each of the models generated using the QST 500 are slightly different, as each model is generated per sketch using different input images, each of the models generated using the QST 500 belong to the same class.

In addition to the sketch 502, the QST 500 receives images 504 with associated textual information when generating a model. In some examples, the images 504 are returned from an image-based search engine as the results of a search performed using sketch 502 as the query. In some instances, the QST 500 may also be configured to receive one or more keywords 506, as inputs from the user, descriptive of the sketch 502. The QST 500 generates object topics 508 and shape topics 510 from multiple inputs including shape features 512, tags 514 and a number of modeled parameters, such as model parameters 516, 518, 520 and 522.

For instance, an image-based search returned N images $\{I_1, I_2, \ldots, I_N\}$ with T associated words $\{w_1, w_2, \ldots, w_T\}$ and a shape feature $r_n$ derived from each of the images $I_n$. Additionally, the object topics 508 may be represented by z having discrete values from 1 to K and the shape topics 510 may be represented by s having discrete values from 1 to $N_s$. The QST 500 also utilizes model parameter 516 represented by $\theta$, the model parameter 518 represented by $\beta$, the model parameter 520 represented by $\mu$ and the model parameter 522 represented by $\sigma$.

The model may be generated by first sampling the object topic $z \sim p(z|I_n)$ for each image $I_n$. Then for each object topic z, the words T $\{w_1, w_2, \ldots, w_T\}$ are sampled given a dictionary of M words $\{w_1, w_2, \ldots, w_M\}$. Thus, each word $w_m$ may be calculated as follows:

$$w_m \sim p(w_m|z, \beta, \text{keywords}) = \beta_{z, w_m}^{\delta(w_m, \text{keywords})} \quad (2)$$

where $\delta$ is equal to 1 if $w_m \in \{w_1, w_2, \ldots, w_T\}$ and zero otherwise. The shape topics s are also sampled for each of the object topics z as follows:

$$s \sim p(s|z, \theta) = \theta_{z,s} \quad (3)$$

Next for each of the shape topics s, the shape features $r_n$ are derived according to the following equations:

$$r_n \sim p(r_n|s, \mu, \sigma, \beta, \text{sketch}) = \quad (4)$$

$$\frac{1}{\sqrt{2\pi\sigma_s^2}} \exp\left(-\frac{\text{dist}(r_n, \mu_s)^2}{2\sigma_s^2} \text{dist}(r_n|\text{sketch})\right)$$

in which $\text{dist}(r_n, \mu_s)$ is defined as the distance between $r_n$ and $\rho_s$, and $\text{dist}(r_n|\text{sketch})$ is the distance between $r_n$ and the sketch 502. Thus, a model including object topics 508, shape topics 510 and shape features 512 may be generated.

Given the model generated as discussed above, the probability that a word should be used as a tag for the sketch 502 may be calculated according to the following probability:

$$p(I, w, r, z, s | \theta, \mu, \sigma, \beta, \text{sketch}, \text{keywords}) = \quad (5)$$

$$\prod_{n=1}^{N} \left\{ p(I_n) p(z|I_n) p(r_n|s, \mu, \sigma, \beta, \text{sketch}) p(s|z, \theta) \prod_{m=1}^{M} (p(w_m|z, \beta, \text{keywords})^{\delta(I_n, w_m)}) \right\}$$

where $\delta(I_n, w_m)$ is equal to 1 if $w_m \in \{w_1, w_2, \ldots, w_T\}$ and zero otherwise. The word with the highest probability is selected as the tag or label for the sketch 502.

In some implementations, the model parameters 516, 518, 520 and 522 may be trained, for example, using an expectation-maximization (EM) approach. For instance, by maximizing a log-likelihood ratio L which may be expressed as follows:

$$L = \quad (6)$$

$$F + \sum_{n=1}^{N} KL(q(z, s) || p(z, s | I_n, w, r_n, \theta, \mu, \sigma, \beta, \text{sketch}, \text{keywords})),$$

and $F =$ \quad (7)

$$\sum_{n=1}^{N} \sum_{z} \sum_{s} q(z, s) \log \frac{p(I_n, w, r_n, z, s | \theta, \mu, \sigma, \beta, \text{sketch}, \text{keywords})}{q(z, s)}$$

where, as discussed above, the model parameter 516 is represented by $\theta$, the model parameter 518 is represented by $\beta$, the model parameter 520 is represented by $\mu$ and the model parameter 522 is represented by $\sigma$.

The EM approach may be used to iteratively maximize the lower bound F and minimize the KL-divergence. Thus the E-step is calculated as follows:

$$q(z, s | I = I_n) = \frac{p(z, s, I = I_n, w, r_n | \theta, \mu, \sigma, \beta, \text{sketch}, \text{keywords})}{p(I = I_n, w, r_n | \theta, \mu, \sigma, \beta, \text{sketch}, \text{keywords})} \quad (8)$$

Given equation (8), the latent variables may be estimated according to the following equation:

$$q(z, s | I = I_n) \propto p(I = I_n) p(z | I = I_n) \times p(s | z, \theta) p(r_n | s, \mu, \sigma, \beta, \text{sketch}) \prod_{m=1}^{M} (p(w_m | z, \beta, \text{keywords}))^{\delta(I_n, w_m)} \quad (9)$$

Since the joint distribution of s and z may be obtained in condition of observed variable and parameters, it is not necessary to determine the separate joint probabilities for s and z. Therefore, the lower bound F is maximized in the M-step as follows:

$$p(z | I_n) \propto \sum_{s} q(z, s | I_n), \quad (10)$$

$$\theta_{z,s} = p(s | z, \theta) \propto \sum_{n=1}^{N} q(z, s | I_n), \quad (11)$$

$$\beta_{z,\beta} = p(w_m \mid z, \beta) \propto \sum_{n=1}^{N} \sum_{s} \delta(I_n, w_m) q(z, s \mid I_n) \quad (12)$$

The Gaussian may then be represented by the centermost sample of the distribution as follows:

$$\mu_s = \arg\max_{\mu} \sum_{n=1}^{N} \sum_{z} q(z, s \mid I_n) dist(r_n \mid \text{sketch}) \left( -\frac{dist(r_n, \mu)^2}{2\sigma_s^2} \right) \quad (13)$$

and the estimated variance is:

$$\sigma_s = \sqrt{\frac{\sum_{n=1}^{N} \sum_{z=1}^{K} q(z, s \mid I_n) dist(r_n \mid \text{sketch}) dist(r_n, \mu_s)^2}{\sum_{n=1}^{N} \sum_{z=1}^{K} q(z, s \mid I_n) dist(r_n \mid \text{sketch})}} \quad (14)$$

By iteratively performing the EM steps as described above the model parameters 516-522 converge and, thus, may be trained to produce more accurate tags or labels for the hand-drawn sketches 502.

Figure 6:
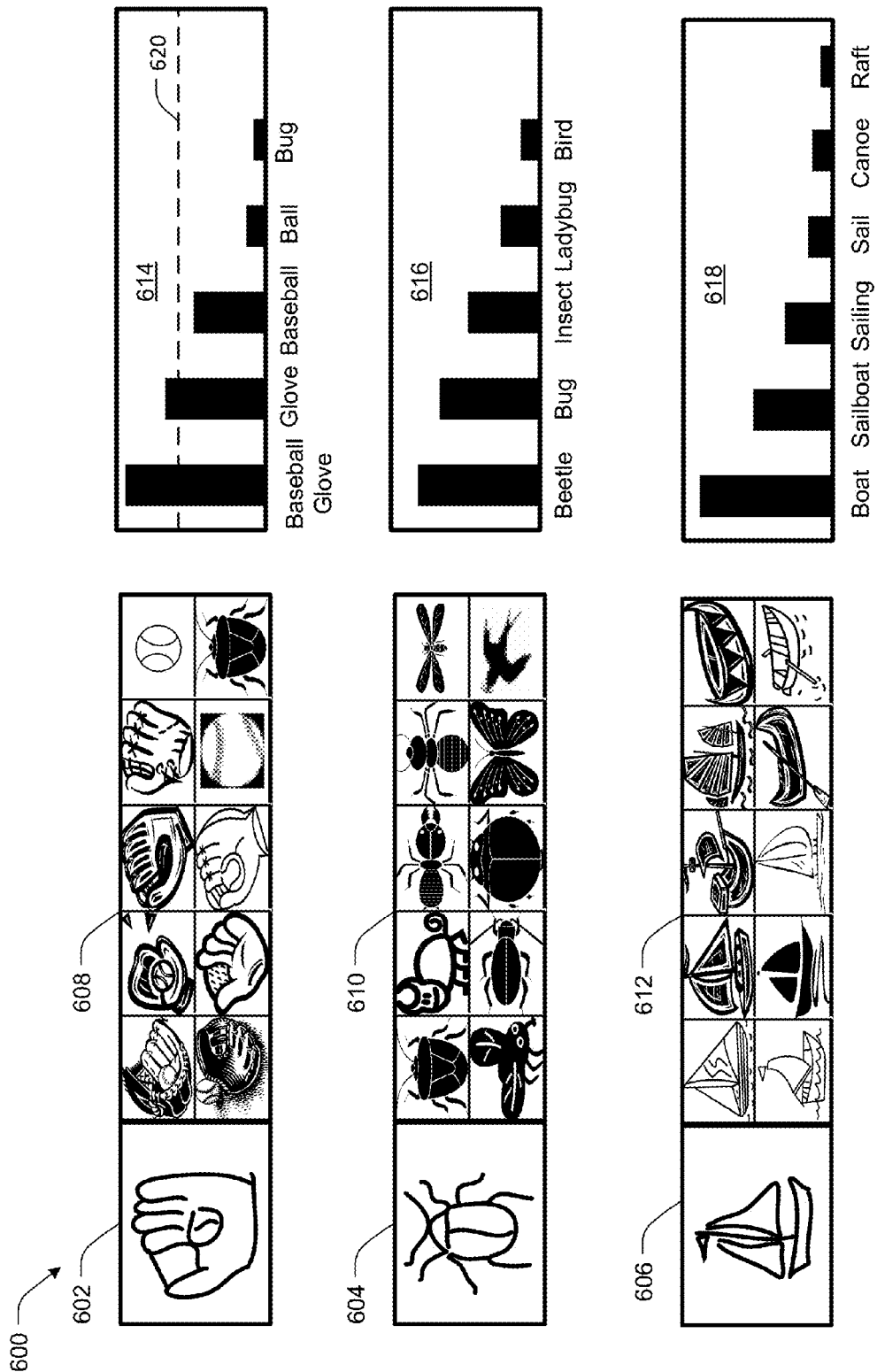
FIG. 6 is a pictorial view of example word rankings generated by a sketch recognition system according to some implementations.

FIG. 6 is a pictorial view of example word rankings generated by a sketch recognition system 600 according to some implementations. As illustrated, sketches 602, 604 and 606 are received by the sketch recognition system 600. Generally, the sketch recognition system 600 submits each of the sketches 602, 604 and 606 to one or more image-based search engines. The image-based search engines search one or more image collections of previously identified images and provide the identified images to the sketch recognition system 600.

In the illustrated example, the sketch recognition system 600 receives sketch 602 and submits the sketch 602 to the image-based search engine. In response, the sketch recognition system 600 receives images 608. The sketch recognition system 600 models the images 608 using object topics and shape topics as discussed above. For instance, the sketch recognition system 600 may have model the images 608 using the QST model described above with respect to FIG. 5.

Once the model is generated, the sketch recognition system 600 determines a score for each word or phrase associated with one of the generated object topics and the words are ranked as shown in graph 614. As illustrated, the phrase "baseball glove" is ranked the highest, so the phrase "baseball glove" is applied to the sketch 602. Likewise, the sketch recognition system 600 receives sketches 604 and 606, performs an image-based search, and receives images 610 and 612 in response. A model for each of the image sets 610 and 612 are generated and words and phrases are selected (for example, based on frequency) from text associated with the images 610 and 612. Scores/probabilities are determined for the selected words and phrases and the words and phrases are ranked according to the scores (as shown in graphs 616 and 618 respectively). Once ranked, the highest ranking word or phrase is selected as a tag for the sketches 604 and 606. Thus, as illustrated, the sketch 604 has the word "beetle" applied and the sketch 606 has the word "boat" applied.

In some instances, the top ranking word or phrase may be applied to the image as a label, while a predetermined number of other word may be associated with the sketch to aid in future image based searches. For example, sketch 606 may have the word "boat" applied as a label, while the words "sailboat", "sailing" and "sail" may be also be associated with the sketch 606. In one particular implementation, a word or phrase may be associated with a sketch if the word or phrase earns a score greater than a predetermined threshold value. For example, graph 614 is shown with threshold 620. In this implementation, the phrase "baseball glove" and the word "glove" would be associated with the sketch 602, as both "baseball glove" and "glove" are above the threshold 620.

In one particular implementation, the scores illustrated in graphs 614, 616 and 618 may be generated based on a probability that each word should be applied to a sketch. For example, given N images $\{I_1, I_2, \ldots, I_N\}$ and M words $\{w_1, w_2, \ldots, w_M\}$. A probability, $p(w=w_m|\text{sketch})$, that a word applies to the sketch given a model based on object topics and shape topics may be expressed as follows:

$$p(w = w_m \mid \text{sketch}) = \sum_{n=1}^{N} p(I_n) \sum_{z} p(w = w_m \mid z, \beta) p(z \mid I_n) \quad (15)$$

where the z denotes the object topics and $\beta$ is a tunable parameter. Once the probabilities are calculated for each of the M words, the M words are ranked, as illustrated by graphs 614, 616 and 618.

In another implementation, the scores illustrated in graphs 614, 616 and 618 may be generated based on a voting approach. For example, given N images $\{I_1, I_2, \ldots, I_N\}$ and M words $\{w_1, w_2, \ldots, w_M\}$. A score, score(w|sketch), that a word applies to a sketch considering both visual similarity and word frequency may be expressed as follows:

$$\text{socre}(w \mid \text{sketch}) = \sum_{n=1}^{N} \#(w, I_n) \times \text{score}(I_n \mid \text{sketch}) \quad (16)$$

where $\#(w, I_n)$ is the number of times the word occurs in the text surrounding the N images $\{I_1, I_2, \ldots, I_N\}$ and score($I_n$|sketch) represents the visual similarity between $I_n$ and the sketch.

Illustrative Processes

Figure 7:
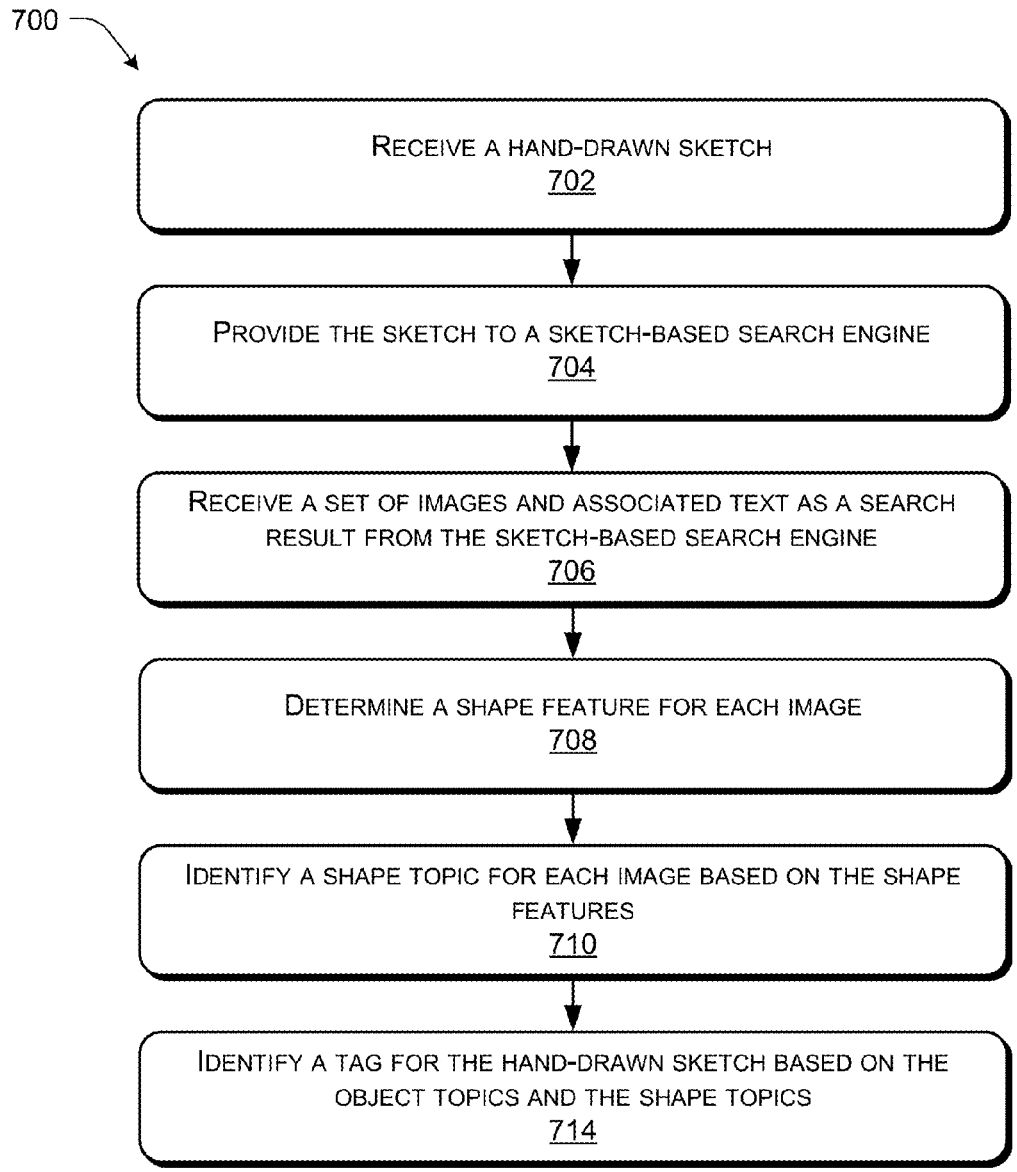
FIG. 7 is an example flow diagram showing an illustrative process for providing a text-based tag to a sketch according to some implementations.

FIG. 7 is a flow diagram illustrating example processes for tagging hand-drawn sketches. The process is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 7 is an example flow diagram showing an illustrative process 700 for providing a text-based tag to a sketch according to some implementations. For example, the process 700 may be a sketch recognition system configured to tag or label sketches for use in one or more web-based image search engines. At 702, the sketch recognition system receives a sketch. For example, the sketch recognition system may receive the sketch from a computing device (such as computing device 102 of FIG. 1) for tagging before posting the sketch on one or more social media websites.

At 704, the sketch recognition system provides the sketch to an image-based search engine. The image-based search engine uses the sketch as a query to search one or more collections of images for images having similar visual features to that of the sketch. For example, the image-based search engine may search one or more clipart databases, as the contours of the clipart images have a similar style to sketches, the images are often of a single object and the images are typically tagged by the illustrator (i.e., include one or more caption or text-based identifier).

At 706, the sketch recognition system receives a set off images and associated text in response to providing the sketch to the image-based search engine. The set of images may be images having different objects and/or variant shapes, which results in intra-class shape variation and inter-class shape ambiguity.

At 708, the sketch recognition system determines a shape feature for each of the images. For example, the shape feature may be one or more mathematical representations derived from the contours, shapes, lengths and/or directions of the line segments of each image.

At 710, the sketch recognition system identifies a shape topic for each of the images based on the shape feature. For example, the sketch recognition system may calculate a probability that each of the images belongs to a shape topic given the shape feature derived from the image. Each image may then be associated with the shape topic, which scored the highest probability.

At 712, the sketch recognition system identifies an object topic for each of the images based on the shape topic. For example, the sketch recognition system may calculate a probability that each of the images belongs to an object topic given the associated shape topic. Each image may then be associated with the object topic, which scored the highest probability.

At 714, the sketch recognition system identifies a subject or tag for the sketch based on the object topics and the shape topics. For instance, a score may be calculated for each of the words in text corresponding to the images of an object topic and the word with the highest score may be selected. For example, given N images $\{I_1, I_2, \ldots, I_N\}$ and M words $\{w_1, w_2, \ldots, w_M\}$. A probability, $p(w=w_m|\text{sketch})$, that a word applies to the sketch given a model based on object topics and shape topics may be expressed as follows:

$$p(w = w_m \mid \text{sketch}) = \sum_{n=1}^{N} p(I_n) \sum_{z} p(w = w_m \mid z, \beta) p(z \mid I_n) \quad (17)$$

where the z denotes the object topics and β is a tunable parameter. Once the probabilities are calculated for each of the M words, the M words may be ranked and the top ranking word is selected as the tag for the sketch.

In another example, given N images $\{I_1, I_2, \ldots, I_N\}$ and M words $\{w_1, w_2, \ldots, w_M\}$. A score, score(w|sketch), that a word applies to the sketch considering both visual similarity and word frequency may be expressed as follows:

$$\text{socre}(w \mid \text{sketch}) = \sum_{n=1}^{N} \#(w, I_n) \times \text{score}(I_n \mid \text{sketch}) \quad (18)$$

where $\#(w, I_n)$ is the number of times the word occurs in the text surrounding the N images $\{I_1, I_2, \ldots, I_N\}$ and score($I_n$|sketch) represents the visual similarity between $I_n$ and the sketch. The M words may again be ranked and the top ranking tag is selected as the tag for the sketch.

Illustrative System

Figure 8:
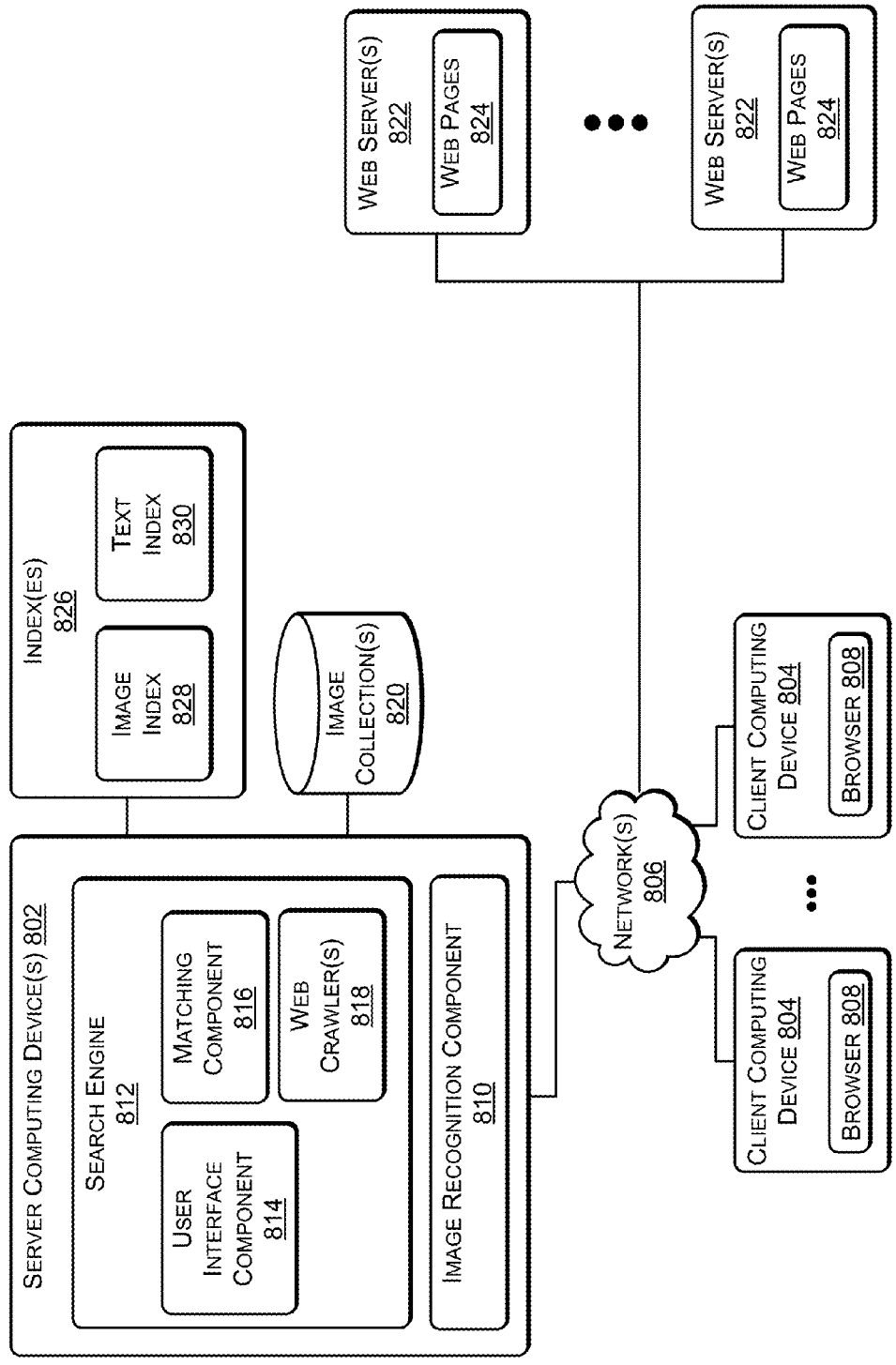
FIG. 8 is a block diagram illustrating an example system for carrying out sketch-based image recognition according to some implementations.

FIG. 8 is a block diagram illustrating an example system 800 for carrying out sketch-based image recognition according to some implementations. To this end, the system 800 includes one or more server computing device(s) 802 in communication with a plurality of client or user computing devices 804 through a network 806 or other communication link. In some implementations, server computing device 802 exists as a part of a data center, server farm, or the like, and is able to serve as a component for providing a commercial search website. The system 800 can include any number of the server computing devices 802 in communication with any number of client computing devices 804. For example, in one implementation, network 806 includes the World Wide Web implemented on the Internet, including numerous databases, servers, personal computers (PCs), workstations, terminals, mobile devices and other computing devices spread throughout the world and able to communicate with one another. Alternatively, in another possible implementation, the network 806 can include just a single server computing device 802 in communication with one or more client devices 804 via a LAN (local area network) or a WAN (wide area network). Thus, the client computing devices 804 can be coupled to the server computing device 802 in various combinations through a wired and/or wireless network 806, including a LAN, WAN, or any other networking technology, using one or more protocols, for example, a transmission control protocol running over Internet protocol (TCP/IP), or other suitable protocols.

In some implementations, client computing devices 804 are personal computers, workstations, terminals, mobile computing devices, PDAs (personal digital assistants), cell phones, smartphones, laptops, tablet computing devices, wearable computing devices, or other computing devices having data processing capability. Furthermore, client computing devices 804 may include a browser 808 for communicating with server computing device 802, such as for presenting a user interface of the sketching model to a user and for submitting a sketch to the server computing device 802. Browser 808 may be any suitable type of web browser such as Internet Explorer®, Firefox®, Chrome®, Safari®, or other type of software configured to enable submission of a sketch for recognition as disclosed herein.

In addition, server computing device 802 may include an image recognition component 810, such as image recognition component 104 of FIG. 1, and an image-based search engine 812 for performing an image search using the sketch received from client computing devices 804 as a query.

Accordingly, in some implementations, search engine 814 may include user interface component 816 and matching component 818, for performing the image-based search on one or more image collections 820, as described herein. In some implementations, user interface component 814 may provide the user interface to the user as a webpage able to be viewed and interacted with by the client computing devices 804 through browsers 808.

Additionally, the search engine 812 may include one or more web crawlers 818 for searching one or more web servers 822 to locate, tag and/or index images from one or more web pages 824. The web crawlers 818 may generate one or more indexes 826, such as an image index 828 and a text index 830. In some implementations, the indexes 826 may be utilized to locate one or more images in the image collections 820 and/or online at one or more web servers 822. Thus, in some examples, the search engine 812 may locate images from multiple websites on the Internet, while, in other examples, the search engine 812 may located the images from the image collection 820 stored in a database accessible by server computing device 802. The web crawlers 818 generate one or more indexes 826 for the images, such as the image index 828 for sketch-based search of images and the text index 830 for text-based search of the images.

The image recognition component 810 identifies the subject of the sketch received from the client computing device 804. The image recognition component 810 may generate a model utilizing the images identified by the search engine 812 in the image collections 820 or using the indexes 826 and the web servers 822. The image recognition component 810 may then select a text-based tag or label for the sketch based on the model generated from the images returned by the search engine 812.

The sketch and the recognition result or tag may be used to perform a natural image search of images available on web pages 824, thus increasing the effectiveness of the search over sketch-based search or text-based search alone. For example, the sketch query may be applied to perform a search using the image index 828, and the recognition result or tag may be used to filter the results for improving the accuracy of the search results for locating the most relevant images. Alternatively, the recognized subject or tag of the sketch query may be used to obtain image results using a text-based image search, and the sketch query may be used as a filter to locate the most relevant images from the text-based image search results.

Furthermore, while an example system architecture is illustrated in FIG. 8, other suitable architectures may also be used, and that implementations herein are not limited to any particular architecture. For example, in some implementations, indexes 828 may be located at server computing device 802. Other variations will also be apparent to those of skill in the art in light of the disclosure herein.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
    receiving, from a computing device over a network, a sketch;
    searching a database of images using the sketch as a query to identify a set of images, an individual image of the set of images including a shape feature similar to at least one shape feature of the sketch;
    determining, based at least in part on the set of images, at least one object topic; and
    generating, based at least in part on the set of images, a model for identifying a subject of the sketch, the model including:
        the at least one object topic, the at least one object topic being representative of a category that is descriptive of the subject of the sketch; and
        at least one shape topic associated with the at least one object topic, the at least one shape topic representative of a shape feature of the sketch.

2. The method of claim 1, wherein the individual image of the set of images further includes at least one text-based label, and wherein the method further comprises:
    generating a word distribution for the at least one object topic from text-based labels of at least a portion of the set of images; and
    identifying a word descriptive of the subject of the sketch from the word distribution.

3. The method of claim 2, wherein the word distribution includes at least a first word and a second word, and wherein the method further comprises:
    determining a first rank for the first word based at least in part on a first probability that the first word is descriptive of the subject of the sketch;
    determining a second rank for the second word based at least in part on a second probability that the second word is descriptive of the subject of the sketch; and
    generating a ranking for the first word and the second word based at least in part on the first rank and the second rank,
    and wherein identifying the word descriptive of the subject of the sketch is based at least in part on the ranking.

4. The method of claim 1, wherein the at least one object topic includes a first object topic and a second object topic, and wherein the method further comprises:
    determining a first probability that a shape topic of the at least one shape topic belongs to the first object topic;
    determining a second probability that the shape topic belongs to the second object topic; and
    associating the shape topic with at least one of the first object topic or the second object topic based at least in part on the first probability and the second probability.

5. The method of claim 4, wherein:
    the first probability is greater than the second probability; and
    associating the shape topic with the at least one of the first object topic or the second object topic comprises associating the shape topic with the first object topic based at least in part on the first probability for the first shape topic being greater than the second probability for the second object topic.

6. The method of claim 1, further comprising:
    filtering the set of images into a set of filtered images by removing images that include more than one subject, and wherein generating the model based at least in part on the set of images comprises generating the model based at least in part on the set of filtered images.

7. The method of claim 1, further comprising:
identifying, for at least an image of the set of images, a shape feature of the image; and
associating the image with a shape topic of the at least one shape topic based at least in part on the shape feature of the image.

8. A computing device comprising:
one or more input interfaces for receiving a sketch;
one or more processors; and
a computer-readable storage media storing instructions, which when executed by the one or more processors, cause the one or more processors to perform operations comprising:
performing an image-based search of a database of images using the sketch as a search query;
identifying a set of images, an individual image of the set of images including a shape feature similar to a shape feature of the sketch;
determining an object topic based at least in part on the set of images; and
generating, based at least in part on the set of images, a model for identifying a subject associated with the sketch, the model including:
the object topic, the object topic representative of a category for the subject that is associated with the sketch; and
a shape topic associated with the object topic, the shape topic representative of the shape feature of the sketch.

9. The computing device of claim 8, wherein the individual image of the set of images is associated with at least one text-based label, and wherein the operations further comprise:
generating a word distribution for the object topic from text-based labels associated with at least a portion of the set of images; and
identifying a word descriptive of the subject associated with the sketch from the word distribution.

10. The computing device of claim 9, wherein the word distribution includes at least a first word and a second word, and wherein the operations further comprise:
determining a first rank for the first word based at least in part on a first probability that the first word is descriptive of the subject associated with the sketch;
determining a second rank for the second word based at least in part on a second probability that the second word is descriptive of the subject associated with the sketch; and
generating a ranking for the first word and the second word based at least in part on the first rank and the second rank,
and wherein identifying the word descriptive of the subject of the sketch is based at least in part on the ranking.

11. The computing device of claim 8, wherein the model further includes an additional object topic, and wherein the operations further comprise:
determining a first probability that the shape topic is associated with the object topic;
determining a second probability that the shape topic is associated with the additional object topic; and
associating the shape topic with the object topic based at least in part on the first probability and the second probability.

12. The computing device of claim 8, the operations further comprising:
filtering the set of images into a set of filtered images by removing images that include more than one subject,
and wherein generating the model based at least in part on the set of images comprises generating the model based at least in part on the set of filtered images.

13. The computing device of claim 8, the operations further comprising:
identifying, for at least an image of the set of images, a shape feature of the image; and
associating the image with the shape topic based at least in part on the shape feature of the image.

14. A computer-readable storage media storing instructions that, when executed by one or more processors, cause the one or more processors to perform operations comprising:
searching a database of images using a sketch as a query to identify a set of images, an individual image of the set of images including a shape feature similar to at least one shape feature of the sketch;
determining, based at least in part on the set of images, at least one object topic; and
generating, based at least in part on the set of images, a model for identifying a subject of the sketch, the model including:
the at least one object topic, the at least one object topic being representative of a category that is descriptive of the subject of the sketch; and
at least one shape topic associated with the at least one object topic, the at least one shape topic representative of a shape feature of the sketch.

15. The computer-readable storage media of claim 14, wherein the individual image of the set of images further includes at least one text-based label, and wherein the operations further comprise:
generating a word distribution for the at least one object topic from text-based labels of at least a portion the set of images; and
identifying a word descriptive of the subject of the sketch from the word distribution.

16. The computer-readable storage media of claim 15, wherein the word distribution includes at least a first word and a second word, and wherein the operations further comprise:
determining a first rank for the first word based at least in part on a first probability that the first word is descriptive of the subject of the sketch;
determining a second rank for the second word based at least in part on a second probability that the second word is descriptive of the subject of the sketch; and
generating a ranking for the first word and the second word based at least in part on the first rank and the second rank,
and wherein identifying the word descriptive of the subject of the sketch is based at least in part on the ranking.

17. The computer-readable storage media of claim 14, wherein the at least one object topic includes a first object topic and a second object topic, and wherein the operations further comprise:
determining a first probability that a shape topic of the at least one shape topic belongs to the first object topic;
determining a second probability that the shape topic belongs to the second object topic; and
associating the shape topic with at least one of the first object topic or the second object topic based at least in part on the first probability and the second probability.

18. The computer-readable storage media of claim 17, wherein:
- the first probability is greater than the second probability; and
- associating the shape topic with the at least one of the first object topic or the second object topic comprises associating the shape topic with the first object topic based at least in part on the first probability for the first shape topic being greater than the second probability for the second object topic.

19. The computer-readable storage media of claim 14, the operations further comprising:
- identifying, for at least an image of the set of images, a shape feature of the image; and
- associating the image with a shape topic of the at least one shape topic based at least in part on the shape feature of the image.

20. The method of claim 1, further comprising identifying a word descriptive of the subject of the sketch using the model.

* * * * *